US006578044B1

(12) United States Patent
Scheifler et al.

(10) Patent No.: US 6,578,044 B1
(45) Date of Patent: Jun. 10, 2003

(54) METHOD AND SYSTEM FOR TYPESAFE ATTRIBUTE MATCHING

(75) Inventors: Robert W. Scheifler, Somerville; Kenneth C.R.C. Arnold, Lexington; James H. Waldo, Dracut, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/044,945

(22) Filed: Mar. 20, 1998

Related U.S. Application Data

(63) Continuation-in-part of application No. 08/971,529, filed on Nov. 17, 1997, now Pat. No. 6,032,151.

(51) Int. Cl.[7] .............................................. G06F 17/30
(52) U.S. Cl. ..................... 707/103; 707/101; 341/55; 395/705
(58) Field of Search ............................. 707/103, 10, 6, 707/4, 202, 101; 709/303; 395/701, 705; 341/55

(56) References Cited

U.S. PATENT DOCUMENTS

| | | | |
|---|---|---|---|
| 4,491,946 A | 1/1985 | Kryskow, Jr. et al. | 395/700 |
| 4,713,806 A | 12/1987 | Oberlander et al. | 395/650 |
| 4,809,160 A | 2/1989 | Mahon et al. | 395/700 |

(List continued on next page.)

FOREIGN PATENT DOCUMENTS

| | | | |
|---|---|---|---|
| EP | 0 300 516 A | 1/1989 | G06F/12/14 |
| EP | 0 351 536 A3 | 1/1990 | G06F/9/46 |
| EP | 0 384 339 A | 8/1990 | G06F/9/46 |

(List continued on next page.)

OTHER PUBLICATIONS

Alexander, et al., "Active Bridging", Proceedings of the ACM/SIGCOMM'97 Conference, Cannes, France, 9/97.
Anonymous: "Change–Notification Service for Shared Files", IBM Technical Disclosure Bulletin, vol. 36, No. 8, pp. 77–82, Aug. 1993, XP002108713, New York, US.
Anonymous: "Resource Preemption for Priority Scheduling." Nov. 1973. IBM Technical Disclosure Bulletin, vol. 16, No. 6, p. 1931 XP002109435 New York, US.

(List continued on next page.)

Primary Examiner—Thomas Black
Assistant Examiner—Charles L. Rones

(57) ABSTRACT

A database system wherein one or more entry databases store a plurality of entries. Each entry is of a given type that defines the fields of the entry. Each field contains or identifies an object with associated attributes or data. The type of each entry may further define behavior in the form of methods the entry can implement. An entry type which is a subtype of another inherits all fields and behavior of its super-type, and contains additional fields and/or defines new/modified behavior. Entries may be expressed in a Java™ programming language. The database system may further employ a search engine which allows queries to be made upon entries in the database. In one implementation, the queries include a read operation, a take operation, and a notify operation. Each query request includes a command indicating the type of operation, and a template which is an entry object having some or all of its fields set to specific values that must be matched exactly. Other fields of the template entry may be specified as wildcards, whose values do not matter. The search engine may further be configured to create an index for caching entries having characteristics which are commonly specified by queries. In one implementation, the databases may also store and perform operations on sets of entries. Additionally, associating attributes to the fields of entries allows the system to achieve type-safe attribute matching.

14 Claims, 18 Drawing Sheets

SINGLE ENTRY MODIFY:  1606 [TEMPLATE]1602, [TEMPLATE]1604 1608

MULTI-ENTRY ADD:  1610 [MULTI-TEMPLATE], [MULTI-ENTRY]1612

MULTI-ENTRY MODIFY/DELETE:  [MULTI-TEMPLATE], [MULTI-TEMPLATE]

NOTIFY:  [TEMPLATE]1614 OR [MULTI-TEMPLATE]1616

U.S. PATENT DOCUMENTS

| | | | |
|---|---|---|---|
| 4,823,122 A | 4/1989 | Mann et al. | 395/650 |
| 4,939,638 A | 7/1990 | Stephenson et al. | 395/700 |
| 4,956,773 A | 9/1990 | Saito et al. | 395/700 |
| 5,088,036 A | 2/1992 | Ellis et al. | 395/425 |
| 5,109,486 A | 4/1992 | Seymour | 395/800 |
| 5,187,787 A | 2/1993 | Skeen et al. | 395/600 |
| 5,218,699 A | 6/1993 | Brandle et al. | 395/2.42 |
| 5,257,369 A | 10/1993 | Skeen et al. | 395/650 |
| 5,293,614 A | 3/1994 | Ferguson et al. | 395/600 |
| 5,297,283 A | 3/1994 | Kelly, Jr. et al. | 370/89 |
| 5,311,591 A | 5/1994 | Fischer | 370/58 |
| 5,339,435 A | 8/1994 | Lubkin et al. | 364/200 |
| 5,386,568 A | 1/1995 | Wold et al. | 340/825.28 |
| 5,390,328 A | 2/1995 | Frey et al. | 364/200 |
| 5,423,042 A | 6/1995 | Jalili et al. | 364/200 |
| 5,440,744 A | 8/1995 | Jacobson et al. | 395/200 |
| 5,448,740 A | 9/1995 | Kiri et al. | 395/650 |
| 5,452,459 A | 9/1995 | Drury et al. | 395/700 |
| 5,455,952 A | 10/1995 | Gjovaag | 395/650 |
| 5,471,629 A | 11/1995 | Risch | 380/4 |
| 5,475,792 A | 12/1995 | Stanford et al. | 395/700 |
| 5,475,817 A * | 12/1995 | Waldo et al. | 709/303 |
| 5,481,721 A | 1/1996 | Serlet et al. | 395/700 |
| 5,504,921 A | 4/1996 | Dev et al. | 395/800 |
| 5,511,197 A | 4/1996 | Hill et al. | 395/700 |
| 5,519,868 A * | 5/1996 | Allen et al. | 395/705 |
| 5,524,244 A | 6/1996 | Robinson et al. | 395/700 |
| 5,548,726 A | 8/1996 | Pettus | 395/200.09 |
| 5,553,282 A | 9/1996 | Parrish et al. | 395/600 |
| 5,555,367 A | 9/1996 | Premerlani et al. | 395/161 |
| 5,555,427 A | 9/1996 | Aoe et al. | 395/800 |
| 5,557,798 A | 9/1996 | Skeen et al. | 395/650 |
| 5,560,003 A | 9/1996 | Nilsen et al. | 395/600 |
| 5,561,785 A | 10/1996 | Blandy et al. | 395/497.01 |
| 5,577,231 A | 11/1996 | Scalzi et al. | 395/500 |
| 5,594,921 A | 1/1997 | Pettus | 395/831 |
| 5,603,031 A | 2/1997 | White et al. | 395/683 |
| 5,617,537 A | 4/1997 | Yamada et al. | 395/200.01 |
| 5,628,005 A | 5/1997 | Hurvig | 395/608 |
| 5,640,564 A | 6/1997 | Hamilton et al. | 395/683 |
| 5,644,768 A | 7/1997 | Periwal et al. | 395/672 |
| 5,652,789 A * | 7/1997 | Miner et al. | 379/201 |
| 5,652,888 A | 7/1997 | Burgess | 395/683 |
| 5,655,148 A | 8/1997 | Richman et al. | 395/828 |
| 5,659,751 A | 8/1997 | Heninger | 395/685 |
| 5,671,225 A | 9/1997 | Hooper et al. | 370/468 |
| 5,675,796 A | 10/1997 | Hodges et al. | 395/670 |
| 5,680,573 A | 10/1997 | Rubin et al. | 395/456 |
| 5,680,617 A | 10/1997 | Gough et al. | 395/615 |
| 5,684,955 A | 11/1997 | Meyer et al. | 395/200.03 |
| 5,689,709 A | 11/1997 | Corbett et al. | 395/683 |
| 5,706,435 A | 1/1998 | Barbará et al. | 395/200.09 |
| 5,706,502 A | 1/1998 | Foley et al. | 395/610 |
| 5,724,588 A | 3/1998 | Hill et al. | 395/684 |
| 5,727,145 A | 3/1998 | Nessett et al. | 395/186 |
| 5,737,607 A | 4/1998 | Hamilton et al. | 395/701 |
| 5,745,678 A | 4/1998 | Herzberg et al. | 395/186 |
| 5,745,695 A | 4/1998 | Gilchrist et al. | 395/200.57 |
| 5,745,703 A | 4/1998 | Cejtin et al. | 395/200.68 |
| 5,745,755 A | 4/1998 | Covey | 395/619 |
| 5,748,897 A | 5/1998 | Katiyar | 395/200.49 |
| 5,754,849 A | 5/1998 | Dyer et al. | 395/612 |
| 5,757,925 A | 5/1998 | Faybishenko | 380/49 |
| 5,761,656 A | 6/1998 | Ben-Shachar | 707/4 |
| 5,764,897 A | 6/1998 | Khalidi | 395/200.31 |
| 5,768,532 A | 6/1998 | Megerian | 395/200.75 |
| 5,774,551 A | 6/1998 | Wu et al. | 380/25 |
| 5,778,187 A | 7/1998 | Monteiro et al. | 395/200.61 |
| 5,778,228 A | 7/1998 | Wei | 395/684 |
| 5,778,368 A * | 7/1998 | Hogan et al. | 707/10 |
| 5,787,425 A * | 7/1998 | Bigus | 707/6 |
| 5,787,431 A * | 7/1998 | Shaughnessy | 707/100 |
| 5,790,548 A | 8/1998 | Sistanizadeh et al. | 370/401 |
| 5,802,367 A | 9/1998 | Held et al. | 395/685 |
| 5,808,911 A | 9/1998 | Tucker et al. | 364/559 |
| 5,809,507 A | 9/1998 | Cavanaugh, III | 707/103 |
| 5,812,819 A | 9/1998 | Rodwin et al. | 395/500 |
| 5,813,013 A | 9/1998 | Shakib et al. | 707/102 |
| 5,815,149 A | 9/1998 | Mutschler, III et al. | 345/335 |
| 5,815,709 A * | 9/1998 | Waldo et al. | 709/303 |
| 5,815,711 A | 9/1998 | Sakamoto et al. | 395/701 |
| 5,818,448 A | 10/1998 | Katiyar | 345/335 |
| 5,829,022 A | 10/1998 | Watanabe et al. | 711/118 |
| 5,832,219 A | 11/1998 | Pettus | 395/200.33 |
| 5,832,529 A | 11/1998 | Wollrath et al. | 707/206 |
| 5,832,593 A | 11/1998 | Wurst et al. | 29/750 |
| 5,835,737 A | 11/1998 | Sand et al. | 395/293 |
| 5,842,018 A | 11/1998 | Atkinson et al. | 395/700 |
| 5,844,553 A | 12/1998 | Hao et al. | 345/329 |
| 5,845,129 A | 12/1998 | Wendorf et al. | 395/726 |
| 5,848,274 A * | 12/1998 | Hamby et al. | 395/705 |
| 5,860,004 A * | 1/1999 | Fowlow et al. | 395/701 |
| 5,860,153 A | 1/1999 | Matena et al. | 711/216 |
| 5,862,325 A * | 1/1999 | Reed et al. | |
| 5,864,862 A * | 1/1999 | Kriens et al. | 707/103 |
| 5,864,866 A * | 1/1999 | Henckel et al. | 707/103 |
| 5,864,875 A * | 1/1999 | Huben et al. | 707/200 |
| 5,872,928 A | 2/1999 | Lewis et al. | 395/200.52 |
| 5,872,973 A | 2/1999 | Mitchell et al. | 395/685 |
| 5,875,335 A | 2/1999 | Beard | 395/705 |
| 5,878,411 A * | 3/1999 | Burroughs et al. | 707/4 |
| 5,884,024 A | 3/1999 | Lim et al. | 395/187.01 |
| 5,884,079 A | 3/1999 | Furusawa | 395/701 |
| 5,887,134 A | 3/1999 | Ebrahim | 395/200.3 |
| 5,889,951 A | 3/1999 | Lombardi | 395/200.49 |
| 5,890,158 A | 3/1999 | House et al. | 707/10 |
| 5,892,904 A | 4/1999 | Atkinson et al. | 395/187.01 |
| 5,913,029 A | 6/1999 | Shostak | 395/200.33 |
| 5,920,867 A * | 7/1999 | Van Huben et al. | 707/101 |
| 5,933,497 A | 8/1999 | Beetcher et al. | 380/4 |
| 5,935,249 A | 8/1999 | Stern et al. | 713/201 |
| 5,940,827 A | 8/1999 | Hapner et al. | 707/8 |
| 5,944,793 A | 8/1999 | Islam et al. | 709/220 |
| 5,946,485 A | 8/1999 | Weeren et al. | 395/703 |
| 5,946,694 A * | 8/1999 | Copeland et al. | 707/103 |
| 5,949,998 A | 9/1999 | Fowlow et al. | 395/701 |
| 5,950,201 A * | 9/1999 | Van Huben et al. | 707/10 |
| 5,956,509 A | 9/1999 | Kevner | 395/684 |
| 5,963,947 A | 10/1999 | Ford et al. | 707/10 |
| 5,966,531 A | 10/1999 | Skeen et al. | 395/683 |
| 5,969,967 A | 10/1999 | Aahlad et al. | 364/131 |
| 5,977,890 A * | 11/1999 | Rigoutsos et al. | 341/55 |
| 5,987,506 A | 11/1999 | Carter et al. | 709/213 |
| 5,999,179 A | 12/1999 | Kekic et al. | 345/349 |
| 6,003,035 A * | 12/1999 | Breame | 707/102 |
| 6,003,763 A | 12/1999 | Gallagher et al. | 235/379 |
| 6,009,103 A | 12/1999 | Woundy | 370/401 |
| 6,016,496 A | 1/2000 | Roberson | 707/103 |
| 6,016,500 A * | 1/2000 | Waldo et al. | 707/202 |
| 6,026,414 A | 2/2000 | Anglin | 707/204 |
| 6,031,977 A | 2/2000 | Pettus | 395/200.06 |
| 6,032,151 A * | 2/2000 | Arnold et al. | 707/103 |
| 6,032,152 A * | 2/2000 | Pearson | 707/103 |
| 6,061,699 A | 5/2000 | DiCecco et al. | 707/513 |
| 6,061,713 A | 5/2000 | Bharadhwaj | 709/203 |
| 6,065,009 A * | 5/2000 | Leymann et al. | 707/10 |
| 6,085,198 A * | 7/2000 | Skinner et al. | 707/103 |
| 6,216,138 B1 | 4/2001 | Wells et al. | 707/502 |

FOREIGN PATENT DOCUMENTS

| | | | |
|---|---|---|---|
| EP | 0 472 874 A1 | 3/1992 | H04L/12/24 |

| | | | | |
|---|---|---|---|---|
| EP | 0 474 340 A | 3/1992 | ............ | G06F/9/44 |
| EP | 497 022 A1 | 8/1992 | | |
| EP | 0 555 997 A | 8/1993 | ........... | H04L/29/06 |
| EP | 0 565 849 A | 10/1993 | ............ | G06F/9/44 |
| EP | 0 569 195 A2 | 11/1993 | ........... | H04Q/3/545 |
| EP | 0 625 750 A | 11/1994 | ............ | G06F/9/46 |
| EP | 0 651 328 A | 5/1995 | ............ | G06F/9/46 |
| EP | 0 660 231 A | 6/1995 | ............ | G06F/9/44 |
| EP | 0 697 655 A2 | 2/1996 | ............ | G06F/9/46 |
| EP | 0 718 761 A | 6/1996 | ........... | G06F/9/455 |
| EP | 0 767 432 A2 | 4/1997 | ........... | G06F/12/02 |
| EP | 0 778 520 A2 | 6/1997 | ............ | G06F/9/45 |
| EP | 0 794 493 A2 | 9/1997 | ............ | G06F/9/46 |
| EP | 0 803 810 A2 | 10/1997 | ............ | G06F/9/46 |
| EP | 0 803 811 A | 10/1997 | ............ | G06F/9/46 |
| EP | 0 805 393 A2 | 11/1997 | ............ | G06F/9/46 |
| EP | 0 810 524 A | 12/1997 | ............ | G06F/9/46 |
| EP | 0 817 020 A | 1/1998 | ............ | G06F/9/46 |
| EP | 0 817 022 A2 | 1/1998 | ............ | G06F/9/46 |
| EP | 0 817 025 A | 1/1998 | ............ | G06F/9/46 |
| EP | 836 140 A2 | 4/1998 | | |
| GB | 2 253 079 A | 8/1992 | ........... | G06F/12/24 |
| GB | 2 262 825 A | 6/1993 | ........... | G06F/15/16 |
| GB | 2 305 087 A | 3/1997 | ........... | G06F/11/00 |
| JP | 11-45187 | 2/1999 | | |
| WO | WO92/07335 | 4/1992 | ........... | G06F/15/78 |
| WO | WO92/09948 | 6/1992 | ............ | G06F/3/03 |
| WO | WO93/25962 A1 | 12/1993 | | |
| WO | WO94/03855 | 2/1994 | ............ | G06F/9/46 |
| WO | WO96/03692 A | 2/1996 | ............ | G06F/9/46 |
| WO | WO96/10787 | 4/1996 | ............ | G06F/9/46 |
| WO | WO96/18947 | 6/1996 | ............ | G06F/9/44 |
| WO | WO96/24099 | 8/1996 | ........... | G06F/12/02 |
| WO | WO98/02814 | 1/1998 | ............ | G06F/9/46 |
| WO | WO98/04971 | 2/1998 | ............ | G06F/9/40 |

OTHER PUBLICATIONS

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192, Jan. 1989.

Birrell et al., "Implementing Remote Procedure Calls", ACM Transactions on Computer Systems, vol. 2, No. 1, Feb. 1984, pp. 39–59.

Dave A et al: "Proxies, Application Interface, and Distributed Systems", Proceedings International Workshop on Object Orientation in Operating Systems, Sep. 24, 1992, pp. 212–220.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", HTTP:/WWW.CIS.OHIO–STATE.EDU/HTBIN/RFC/RFC1541.HTML, Oct. 1993, pp. 1–33.

Emms J: "A Definition of an Access Control Systems Language" Computer Standards and Interfaces, vol. 6, No. 4, Jan. 1, 1987, pp. 443–454.

Gosling et al., "The Java (TM) Language Specification", Addison–Wesley, 1996.

Guth, Rob: "JavaOne: Sun to Expand Java Distributed Computing Effort", "HTTP://WWW.SUNWORLD.COM/SWOL–02–1998/SWOL–02–SUNSPOTS.HTML," XP–002109935, P.1, Feb. 20, 1998.

Hamilton et al., "Subcontract: a flexible base for distributed programming"; Proceedings of 14th Symposium of Operating System Principles; (Dec. 1993).

Hartman, J., Manber, U., et al., Liquid Software: A New Paradigm for Networked Systems, Technical Report 96–11, Department of Comp. Sci., Univ. of Arizona, 6/96.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" SOMobjects Developer Toolkit Users Guide, Version 2.1, Oct. 1994 (Oct. 1994), pp. 6–1–6–90.

Jones, Richard, et al., "Garbage Collection: Algorithms for Automatic Dynamic Memory Management," pp. 165–175, John Wiley & Sons, 1996.

Kougiouris et al.; "Support for Space Efficient Object Invocation in Spring"; (Sep. 1994).

Lindholm et al., "The Java (TM) Virtual Machine Specification", Sun Microsystems, Inc., Addison Wesley, 1996.

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE"; Chapters 1–3, 6; (1992).

Waldo J et al: "Events in an RPC based Distributed System" Proceedings of the 1995 Usenix Technical Conference, Proceedings Usenix Winter 1995 Technical Conference, New Orleans, LA. USA, Jan. 16–20, 1995, pp. 131–142.

Wilson, P.R., et al., "Design of the Opportunistic Garbage Collector," Proceedings fo the Object Oriented Programming Systems Languages And Applications Conference, New Orleans, vol. 24, No. 10, Oct. 1989.

Yemini, Y. and S. da silva, "Towards Programmable Networks", IFIP/IEEE International Workshop on Distributed Systems: Operations and Management, L'Aquila, Italy, 10/96.

J. Yin et al., "Using Leases to Support Server Driven Consistency in Large–Scale Systems," Computer Services Department, 18th International Conference on Distributed Computer Systems, University of Texas at Austin, pp. 285–294 (May 26–29, 1998).

Mullender, *Distributed Systems*, Second Edition, Addison–Wesley, 1993.

Howard et al., Scale and Performance in a Distrubuted File System, ACM Transactions on Computer Systems, vol. 6, No. 1, Feb. 1988, pp. 51–81.

Cardelli, Obliq, A lightweight language for network objects, Nov. 5, 1993, pp. 1–37.

Dijkstra, Self–stabilizing Systems in Spite of Distributed Control, Communications for the ACM, vol. 17, No. 11, Nov. 1974, pp. 643–644.

Ousterhout et al., The Sprite Network Operating System, Computer, IEEE, Feb. 1988, pp. 23–26.

Dourish, A Divergence–Based Model of Synchrony and Distribution in Collaborative Systems, Xerox Technical Report EPC–1194–102, 1994, pp. 1–10.

Sharrott et al., ObjectMap: Integrating High Performance Resources into a Distributed Object–oriented Environment, ICODP, 1995.

Birrell et al., Grapevine: An Exercise in Distributed Computing, Communications of the ACM, vol. 25, No. 4, Apr. 1982, pp. 260–274.

*Transparent Network Computing*, Locus Computing Corporation, Jan. 5, 1995.

Gray et al., Leases: An Efficient Fault–Tolerant Mechanism for Distributed File Cache Consistency, ACM, 1989, pp. 202–210.

Lamport et al., The Byzantine Generals Problem, ACM Transactions on Programming Languages and Systems, vol. 4, No. 3, Jul. 1982, pp. 382–401.

Dolev et al., On the Minimal Synchronism Needed for Distributed Consensus, Journal of the ACM, vol. 34, No. 1, Jan. 1987, pp. 77–97.

Mummert et al., Long Term Distributed File Reference Tracing: Implementation and Experience, Carnegie Mellon University School of Computer Science, Nov. 1994, pp. 1–28.

Gelernter et al., *Parallel Programming in Linda*, Yale University, Jan. 1985, pp. 1–21.

Cannon et al., Adding Fault–Tolerant Transaction Processing to LINDA, Software–Practice and Experience, vol. 24(5), May 1994, pp. 449–466.

Kambhatla et al., Recovery with Limited Replay: Fault–Tolerant Processes in Linda, Oregon Graduate Institute, Technical Report CSIE 90–019, Sep. 1990, pp. 1–16.

Anderson et al., Persistent Linda: Linda + Transactions + Query Processing, Proceedings of the 13th Symposium on Fault Tolerant Systems, 1994, pp. 93–109.

Gelernter, Generative Communication in Linda, ACM Transactions on Programming Languages and Systems, vol. 7, No. 1, Jan. 1985, pp. 80–112.

Pinakis, Using Linda as the Basis of an Operating System Microkernel, University of Western Australia, Department of Computer Science, Aug. 1993, pp. 1–165.

LINDA Database Search, Jul. 20, 1995, pp. 1–68.

Carriero et al, Distributed Data Structures in Linda, Yale Research Report YALEU/DCS/RR–438, Nov. 1985.

Agha et al., Actorspaces: An Open Distributed Programming Paradigm, University of Illinois, Report No. UIUCDCS–R–92–1766, Open Systems Laboratory TR No. 8, Nov. 1992, pp. 1–12.

Ahmed et al., A Program Building Tool for Parallel Applications, Yale University, Dec. 1, 1993, pp. 1–23.

Coulouris et al., Distributed Systems Concepts and Designs, Second Edition, Addison–Wesley, 1994.

Birrell et al., Network Objects, DEC SRC Research Report 115, Feb. 28, 1994.

Birrell et al., Distributed Garbage Collection for Network Objects, DEC SRC Research Report 116, Dec. 15, 1993.

Jaworski, Java 1.1 Developer's Guide, Sams.net, 1997.

Wollrath et al., A Distributed Object Model for the Java™ System, USENIX Association, Conference on Object–Oriented Technologies and Systems, Jun. 17–21, 1996.

Harris et al., Proposal for a General Java Proxy Class for Distributed Systems and Other Uses, Netscape Communications Corp., Jun. 25, 1997.

Hamilton, Java and the Shift to Net–Centric Computing Computer, Aug. 1996, pp. 31–39.

Chung et al., A 'Tiny' Pascal Compiler: Part 1: The P–Code Interpreter, BYTE Publications, Inc., Sep. 1978.

Chung et al., A 'Tiny' Pascal Compiler: Part 2: The P–Compiler, BYTE Publications, Inc., Oct. 1978.

Thompson, Regular Expression Search Algorithm, Communications of the ACM, vol. II, No. 6, p. 149 et seq., Jun. 1968.

Mitchell et al., Mesa Language Manual, Xerox Corporation, no date.

McDaniel, An Analysis of a Mesa Instruction Set, Xerox Corporation, May 1982.

Pier, A Retrospective on the Dorado, A High–Performance Personal Computer, Xerox Corporation, Aug. 1983.

Pier, A Retrospective on the Dorado, A High–Performance Personal Computer, IEEE Conference Proceedings, The 10th Annual international Symposium on Computer Architecture, 1983.

Krasner, The Smalltalk–80 Virtual Machine, BYTE Publications Inc., Aug. 1991, pp. 300–320.

Operating Systems Review, ACM Press, vol. 27, No. 5, Dec. 1993, pp. 217–230.

Remote Method Invocation Specification, Sun Microsystems, Inc., (1997) http://java.sun.com/products/jdk/1.1/docs/guide/rmi/spec/rmiTOC.doc.html.

Ake Wikström, "Functional Programming Using Standard ML," Prentice–Hall International Series in Computer Science, 1987, ISBN 0–13–331968–7, pp. 56, 165, 215–217, 227, and 254–264.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Burns et al., "An Analytical Study of Opportunistic Lease Renewal," Distributed Computing Systems, 21st International Conference, pp. 146–153, Apr. 2000.

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

Hoshi et al., "Allocation of the Cross–Connect Function in Leased Circuit Networks," 1992, ICC'92, conference record, SUPERCOMM/ICC '92, A New World of Communications, IEEE International Conference, pp. 1408–1412.

IBM Technical Disclosure Bulletin, "Local Network Monitoring to Populate Access Agent Directory," vol. 36, No. 09A, pp. 403–405, Sep. 1993.

McGrath, "Discovery and Its Discontents: Discovery Protocols for Ubiquitous Computing," Presented at Center for Excellence in Space Data and Information Science, NASA Goddard Space Flight Center, Apr. 5, 2000.

MUX–Elektronik, Java 1.1 Interactive Course, www.lls.se/~mux/javaic.html, 1995.

Stevenson, "Token–Based Consistency of Replicated Servers," IEEE, CH2686–4/89/0000/0179, pp. 179–183, 1989.

Venners, "Jini Technology, Out of the Box," JAVAWORLD, 'Online!, pp. 1–4, Dec. 1998.

* cited by examiner

WRITE: [ENTRY]

READ: [TEMPLATE]

TAKE: [TEMPLATE]

NOTIFY: [TEMPLATE]

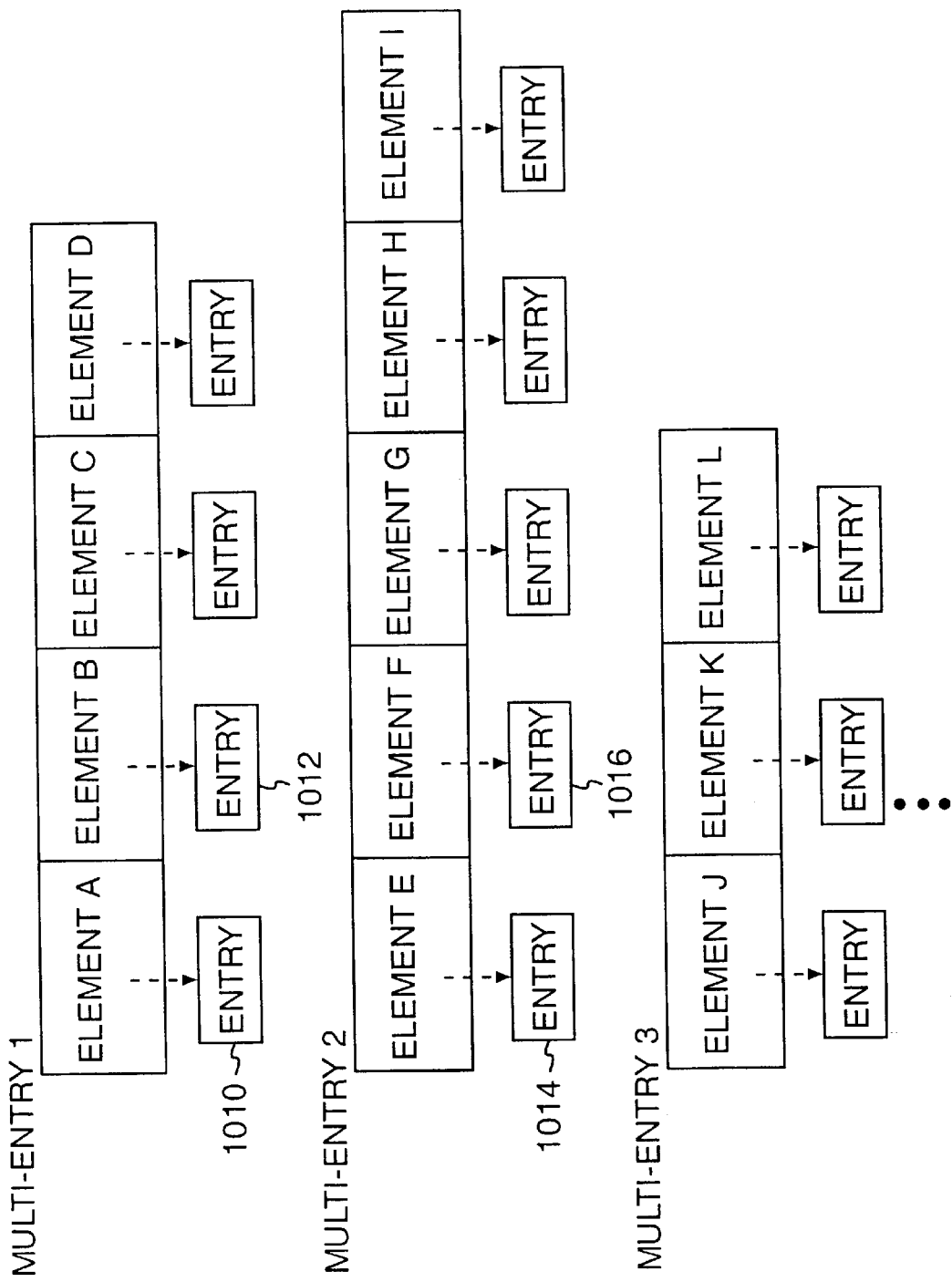

WRITE: [MULTI-ENTRY]

READ: [MULTI-TEMPLATE]

TAKE: [MULTI-TEMPLATE]

NOTIFY: [MULTI-TEMPLATE]

METHOD AND SYSTEM FOR TYPESAFE ATTRIBUTE MATCHING

RELATED APPLICATIONS

This application is a Continuation-in-part of U.S. application Ser. No. 08/971,529 filed on Nov. 17, 1997, now U.S. Pat. No. 6,032,151, issued Feb. 29, 2000 which is incorporated herein by reference.

The following identified U.S. patent applications are relied upon and are incorporated by reference in this application.

Provisional U.S. Patent Application No. 60/076,048, entitled "Distributed Computing System," filed on Feb. 26, 1998.

U.S. patent application Ser. No. 09/044,923, currently pending, entitled "Method and System for Leasing Storage," and filed on the same date herewith.

U.S. patent application Ser. No. 09/044,838, currently pending, entitled "Method, Apparatus, and Product for Leasing of Delegation Certificates in a Distributed System," and filed on the same date herewith.

U.S. patent application Ser. No. 09/044,834, currently pending, entitled "Method, Apparatus and Product for Leasing of Group Membership in a Distributed System," and filed on the same date herewith.

U.S. patent application Ser. No. 09/044,916, U.S. Pat. No. 6,016,500, issued Jan. 18, 2000 entitled "Leasing for Failure Detection," filed on the same date herewith.

U.S. patent application Ser. No. 09/044,933, currently pending, entitled "Method for Transporting Behavior in Event Based System," filed on the same date herewith.

U.S. patent application Ser. No. 09/044,919, currently pending, entitled "Deferred Reconstruction of Objects and Remote Loading for Event Notification in a Distributed System," filed on the same date herewith.

U.S. patent application Ser. No. 09/044,938, currently pending, entitled "Methods and Apparatus for Remote Method Invocation," filed on the same date herewith.

U.S. Pat. No. 6,134,603, issued Oct. 17,200, entitled "Method and System for Deterministic Hashes to Identify Remote Methods," filed on the same date herewith.

U.S. patent application Ser. No. 09/044,790, currently pending, entitled "Method and Apparatus for Determining Status of Remote Objects in a Distributed System," filed on the same date herewith.

U.S. patent application Ser. No. 09/044,930, currently pending, entitled "Downloadable Smart Proxies for Performing Processing Associated with a Remote Procedure Call in a Distributed System," filed on the same date herewith.

U.S. patent application Ser. No. 09/044,917, currently pending, entitled "Suspension and Continuation of Remote Methods," filed on the same date herewith.

U.S. patent application Ser. No. 09/044,835, currently pending, entitled "Method and System for Multi-Entry and Multi-Template Matching in a Database," filed on the same date herewith.

U.S. patent application Ser. No. 09/044,839, currently pending, entitled "Method and System for In-Place Modifications in a Database," filed on the same date herewith.

U.S. patent application Ser. No. 09/044,931, currently pending, entitled "Dynamic Lookup Service in a Distributed System," filed on the same date herewith.

U.S. patent application Ser. No. 09/044,939, currently pending, entitled "Apparatus and Method for Providing Downloadable Code for Use in Communicating with a Device in a Distributed System," filed on the same date herewith.

U.S. patent application Ser. No. 09/044,826, currently pending, entitled "Method and System for Facilitating Access to a Lookup Service," filed on the same date herewith.

U.S. patent application Ser. No. 09/044,932, currently pending, entitled "Apparatus and Method for Dynamically Verifying Information in a Distributed System," filed on the same date herewith.

U.S. patent application Ser. No. 09/030,840, currently pending, entitled "Method and Apparatus for Dynamic Distributed Computing Over a Network," and filed on Feb. 26, 1998.

U.S. patent application Ser. No. 09/044,938, currently pending, entitled "An Interactive Design Tool for Persistent Shared Memory Spaces," filed on the same date herewith.

U.S. patent application Ser. No. 09/044,934, currently pending, entitled "Polymorphic Token-Based Control," filed on the same date herewith.

U.S. Pat. No. 6,138,238, issued Oct. 24, 2000, entitled "Stack-Based Access Control," filed on the same date herewith.

U.S. patent application Ser. No. 09/044,944, currently pending, entitled "Stack-Based Security Requirements," filed on the same date herewith.

U.S. patent application Ser. No. 09/044,837, currently pending, entitled "Per-Method Designation of Security Requirements," filed on the same date herewith.

BACKGROUND OF THE INVENTION

1. Field of the Invention

This invention relates to database systems and, more particularly, to entry storage in database systems. The invention also relates to query matching methodologies employed in database systems.

2. Description of the Related Art

Database systems are serving increasingly important roles in today's society. The amount of data that may be stored by typical database systems is growing at staggering rates, and providing expedient and flexible access to the data is often vital. However, the job of designing database systems which perform in an optimal manner is difficult.

A particularly important consideration in database design is to store the data so that it can be used for a wide variety of applications and such that the manner in which it may be used can be changed quickly and easily. It is further often desirable to allow additional data types or categories to be added without significantly affecting other portions of the database system.

Unfortunately, it is remarkably difficult to change the way data is used and organized in many database systems, and to allow for additional data types and categories. Modifications can set off a chain reaction of changes to programs and other components of the database system, and hence can be exceedingly expensive to accomplish. Consequently, data processing has tended to become frozen into its old data structures. Additionally, designers of database systems tend to make numerous intricate trade-offs between one aspect of the design and another, thus leading to a less than optimal resulting design.

To elaborate further, storing information in a database system is usually done by exact type; that is, a record stored in a database system typically has a certain number and type of fields, such as a tuple in a relation of a relational database. Each field may be defined to store a particular type of data, such as string data, integer data, boolean data, or some other data type, as desired. If a user wants to look-up information in the database, the user must look-up the exact record type (i.e., records of different types are typically searched independently). Thus, if data in which the searcher is interested may be in a record of any one of several different types, the searcher must know in advance which record types might exist, or have some explicit way of asking for all types. The searcher is then required to explicitly look through all possible record types to find the particular record of interest. This complicates the software associated with the search engine and can practically limit the number of different record types that can be maintained.

Furthermore, fields in a record in a database typically do not refer to other records. This reduces the amount and kind of information a single record typically holds. Consequently, databases are limited by their inability to store and manipulate records that are sets of records.

In addition, a record in a typical database is usually not associated with characteristics apart from the actual data itself. For example, when data is found, there is no way to associate behavior with the record that changes with the record type, thus allowing the program to use various records returned by the match in a single way to achieve record-type specific results.

Regarding another aspect of database systems, the usual way of specifying attributes or properties in a database is by a simple set of <name, value> pairs, where the values are either restricted to strings or else are of arbitrary type (type "any"). There is no way to restrict type in these <name, value> pairs, and hence, there is no enforcement that a particular name must always have a value of a particular type. For example, in a hypothetical printer, the "speed" attribute, representing how many pages-per-minute the printer can print, should be enforced as an integer to ensure a user does not set it to something else, such as "about 10 ppm" or "8 to 10." The same kind of problem exists if the values can be objects of any type. In that case, a user can set the attribute to an integer object instead of a string object but still cannot prevent another user from incorrectly storing a string object in an attribute that should only be set to integers.

Furthermore, previous systems have no enforcement of relationships between different attributes (e.g., that one attribute should exist if and only if another attribute also exists). For example, given three exemplary attributes for a printer: resolution (dots per inch), speed (pages per minute), and color (vs. black and white), in reality, many printers can perform different combinations of these attributes. For example, a typical color printer might be described as:

5 pages per minute at 600 dots per inch in black and white;
7 pages per minute at 300 dots per inch in black and white;
1 page per minute at 300 dots per inch in color.

Whereas a given attribute can have multiple values, some conventional systems allow attributes to have multiple values, and these systems might represent the given attributes in the following manner:

speed={1, 5, 7}
resolution={300, 600}
color={true, false} but this does not express the interrelationships between the pairs of attributes. Expressly, there is no representation and enforcement of the three interrelationships:

{speed: 1, resolution: 300, color: true};
{speed: 7, resolution: 300, color: false};
{speed: 5, resolution: 600, color: false}.

Accordingly, it is desirable to provide a database system allowing for polymorphic entry, entry matching and manipulation including sets of entries, to thereby allow more efficient searching and to allow simplified software implementation where many different types exist. It would further be desirable to provide a system where entries may define their own behavior according to type. Additionally, it would be desirable to have type-safe attribute matching in a database system and have enforcement of relationship between attributes.

SUMMARY OF THE INVENTION

The problems outlined above are solved by a method and system for storing and searching entries in a database in accordance with the present invention. In one embodiment, a computer system implements a database system wherein one or more entry databases store a plurality of entries. Each entry is of a given type that defines the fields of the entry. Each of the fields contains or identifies an object with associated attributes or data. The type of each entry may further define behavior in the form of methods the entry is configured to implement. An entry type which is a subtype of another inherits all of the fields and behavior of its supertype, and contains additional fields and/or defines new or modified behavior. Entries may be expressed in a Java™ class of the Java™ programming language. Similarly, in one implementation, each field is expressed in a defined class.

The database system may further employ a search engine which allows queries to be made upon entries in the database. In one implementation, the queries include a read operation, a take operation, and a notify operation. Each query request includes a command indicating the type of operation and a template which is an entry object having some or all of its fields set to specified values that must be matched exactly. Other fields of the template entry may be specified as wildcards, whose values do not matter. The polymorphic entry and entry matching technique advantageously allows a query to be made which might result in a match of an entry which, is the same type as the template entry or which is a subtype of the template entry. This allows for efficient searching and for simplified implementation of the search engine. Furthermore, the search engine need not be aware of all possible subtypes which might exist. Finally, since each entry has an associated class, an entry may define its own behavior by supporting one or more methods. A method of a particular entry may be invoked by a program to implement various functionality, such as equivalence checking.

The search engine may further be configured to create an index for entries having characteristics which are commonly specified by queries. That is, the search engine may detect a pattern of usage and create an index which points to entries having attributes which are commonly specified by received templates. In this manner, expedient entry searching can be accomplished.

Additionally, the search engine may further be configured to store sets of entries in a single record. These sets of entries can be matched using sets of templates.

In one implementation, associating attributes with the fields of entries allows database systems employing entry matching and matching of sets of entries to achieve type-safe attribute matching. The type-safe attribute matching allows the database systems to protect the types of the attributes and enforce relationships between attributes of differing types.

BRIEF DESCRIPTION OF THE DRAWINGS

FIG. 3 further illustrates an entry which is a subtype of another entry;

FIG. 10 is a diagram illustrating several multi-entries, each multi-entry including fields containing entries;

Figure 1:
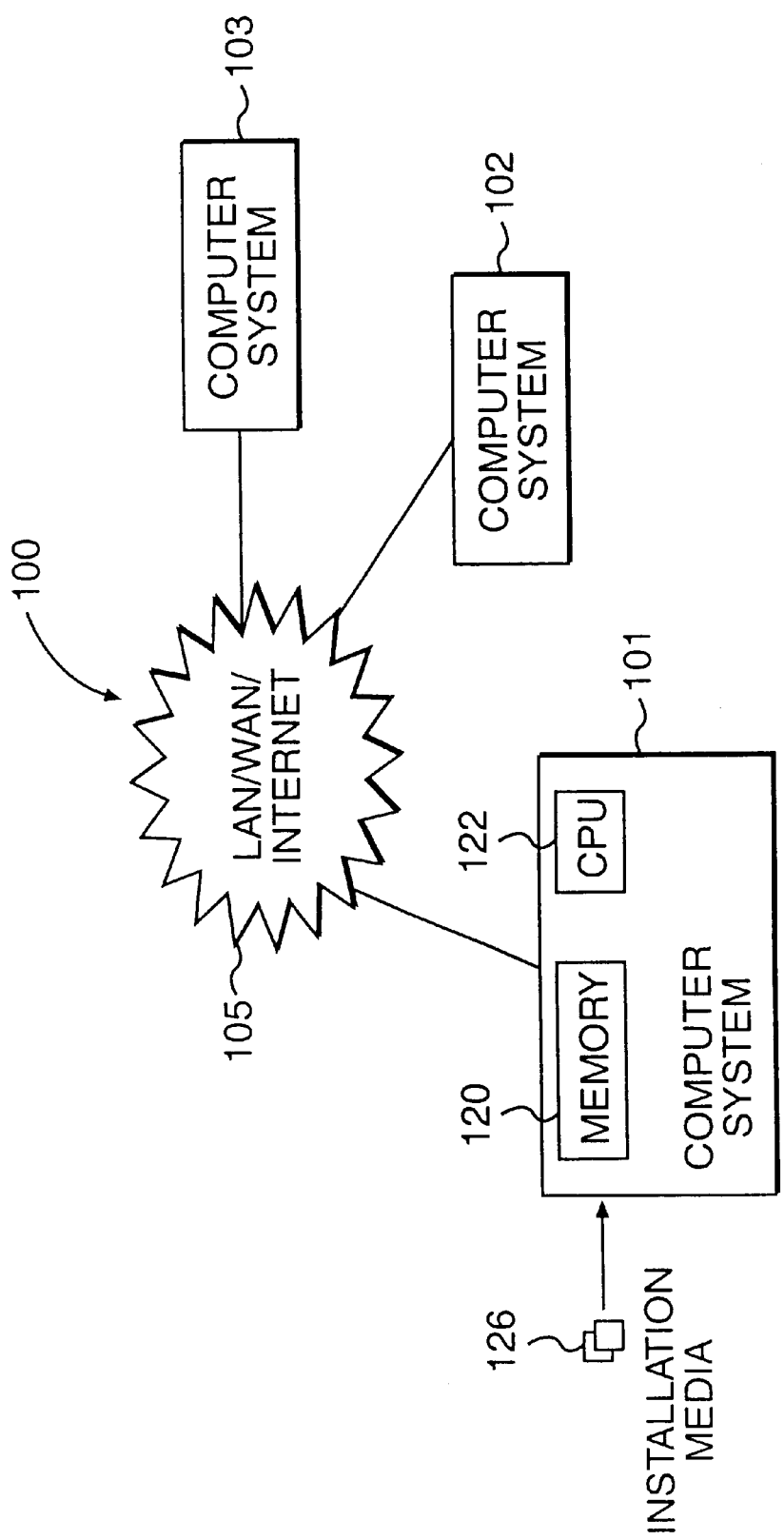
FIG. 1 is a diagram of a distributed computer system employing a database system consistent with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Methods and systems consistent with the present invention store and search entries in a database. Each entry is of a given type which defines the fields of the type, and each field contains or identifies an object of a given type. These entries may be expressed in a Java™ class of the Java™ programming language. Additionally, methods and systems consistent with the present invention may also store and search sets of entries in a database. Generally, these searches are performed using sets of templates.

In one implementation, attributes are associated to the fields of entries. This association allows type-safe attribute matching and the enforcement of relations between different types of attributes.

Distributed System

Turning now to the drawings, FIG. 1 is a diagram illustrating a distributed system 100 in which polymorphic entry, entry matching and entry manipulation in consistent with the present invention may be employed. FIG. 1 shows a plurality of computer systems 101–103 interconnected by a network 105. Network 105 is illustrative of, for example, a local area network (LAN), a wide area network (WAN), or the Internet, among a variety of other possible communication channels. Each computer system includes a memory and a microprocessor such as the exemplary memory 120 and CPU 122 of computer system 101. Memory 120 is representative of various types of possible memory, such as hard disk storage, floppy storage, and dynamic random access memory (DRAM). Installation media 126, which is illustrative of one or more CD ROMs or floppy disks (or other storage media), is further shown in association with computer system 101. Generally speaking, installation media 126 may store code and/or data which implements portions of the search engine and other aspects of the database system described below and may be utilized to install the code and/or data within a particular computer system. It is noted that in other embodiments, a database system in accordance with the invention may be implemented within a single, non-networked computer system.

As will be described in further detail below, computer system 100 implements a database system wherein object oriented techniques are utilized to store entries of possible types or subtypes. This database may also store sets of entries, called multi-entries, as described after the single entry implementation. Entries of the database may be stored solely within memory 122 of computer system 101 or may be distributed across the memories of several different systems, such as memory 122 and similar memories of computer systems 102 and 103. Each entry is of a given type that defines the fields of the entry. Each of the fields contains or identifies an object with associated attributes or data. The type of each entry may further define behavior in the form of methods the entry is configured to implement. An entry type which is a subtype of another inherits all of the fields and behavior of its supertype and contains additional fields and/or defines new/modified behavior.

The database system further employs a search engine, which may be implemented in software, which allows queries to be made upon entries (or multi-entries, described later) in the database. In one implementation, each query includes a template that specifies the values (or attributes) of the key fields of a given entry which must match corresponding fields of the template to result in a successful match. Other fields of the template entry may be specified as wildcards, whose values do not matter. The polymorphic entry and entry matching technique employed by computer system 100 advantageously allows a query to be made which might result in a match of an entry which is the same type as the template entry or which is a subtype of the template entry. Additional details regarding aspects of the polymorphic entry and entry matching technique are provided further below in conjunction with FIGS. 2–9.

Figure 2:
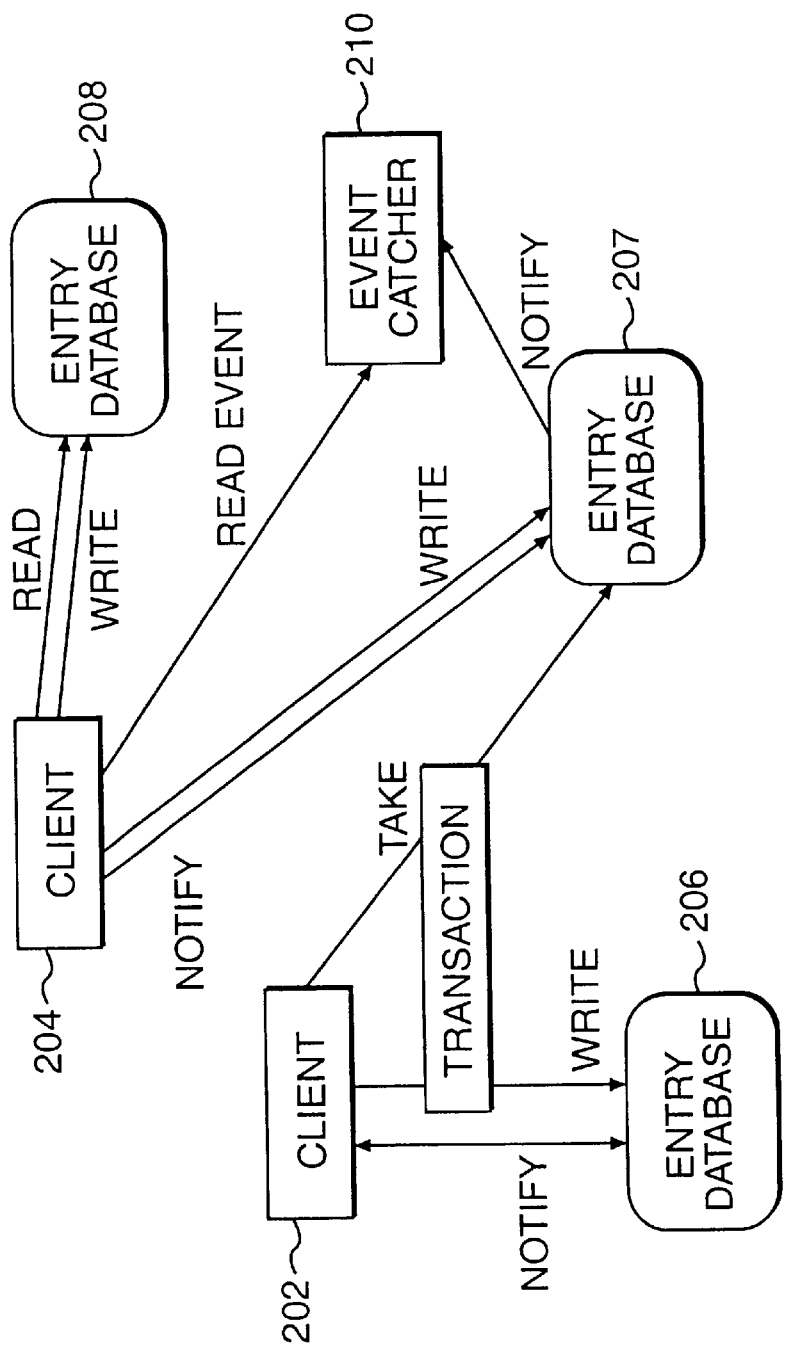
FIG. 2 is a diagram illustrating exemplary communication between a plurality of clients and a plurality of entry databases consistent with the present invention.

FIG. 2 is a diagram illustrating exemplary communication flow between a pair of clients (or users) 202 and 204 and a plurality of entry databases 206–208. Each of the entry databases 206–208 may be distributed across one or more memory subsystems of distributed system 100. Each client 202 and 204 is configured to generate queries which may be provided to one or more of the entry databases 206–208. Clients 202 and 204 may further be configured to store (write) entries within entry databases 206–208, as discussed flirter below. FIG. 2 finally illustrates an event catcher 210, the functionality of which will also be described further below.

Entry Matching and Operation

Figure 3:
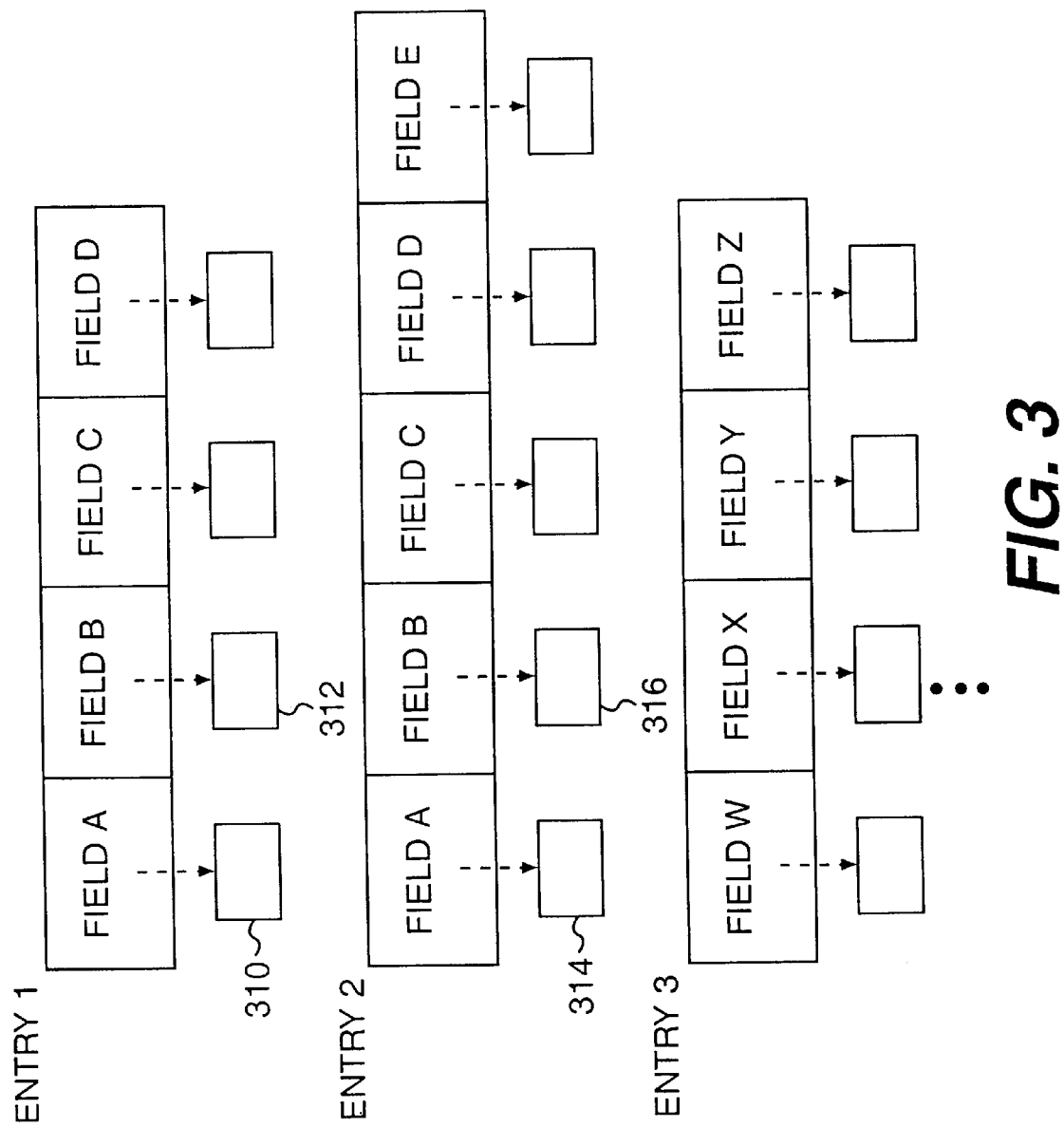
FIG. 3 is a diagram illustrating several entries each including fields of particular types consistent with the present invention.

FIG. 3 is a diagram illustrating a plurality of exemplary entries which may be stored in any of entry databases 206–208. In one implementation, each entry is a typed group of objects expressed in a Java™ class of the Java™ programming language. The Java™ programming language is described in Ken Arnold, James Gosling, *The Java™ Programming Language,* Addison-Wesley, 1996, which is hereby incorporated by reference. Java™ is a registered trademark of Sun Microsystems, Inc. In the United States and other countries. It is understood, however, that in other embodiments, entries may be defined in classes of other programming languages.

Entry 1 of FIG. 3 illustratively includes a set of four fields (field A, field B, field C and field D) which are defined by the class type of entry 1. Entry 2 includes a set of five fields (field A, field B, field C, field D and field E) which are defined by the class type of entry 2. It is noted that entry 2 is a subtype of the type of entry 1, since entry 2 contains the same field types as entry 1, in addition to others.

Entry 3 includes a set of four fields (field W, field X, field Y and field Z) defined by the class type of entry 3. It is noted that while entries 1 and 3 each contain four fields, they represent different types since their field types are not identical.

Numerous other types and subtypes may further be associated with the database system, as desired depending upon the requirements of a particular application or database. Additionally, it is noted that entries are possible which are subtypes of subtypes. For purposes of example only, the following code is illustrative of specific exemplary entries defined in the Java™ programming language:

A "Request For Bid" object for book buying:

```
public class RFB implements Entry {
    public Integer    order number;    \\ The buyer's tracking number
                                        for this order.
    public String     title;            \\ The title of the book.
    public Integer    count;            \\ The number of copies desired.
}
```

A "Full" request for bids, that is, one that includes the ISBN:

```
public class FullRFB extends a RFB {
    public String    isbn; \\         The ISBN field.
}
```

Referring again to FIG. 3, each of the fields of the entries are configured to store values which point to or identify typed objects. Each of these typed objects may similarly be expressed in a Java™ class. For example, field A of entry 1 contains a value identifying objects 310, and field B of entry 1 identifies an object 312. Similarly, field A of entry 2 identifies an object 314, and field B identifies an object 316, and so on. It is noted that for the exemplary entries of FIG. 3, since entry 2 is a subtype of entry 1, the object 310 associated with field A of entry 1 is expressed by the same class type as that of the object 314 associated with field A of entry 2. The attributes or data associated with each of the objects 310 and 314, however, may differ. It is further noted that the objects identified by the fields of the various entries may contain integer data, boolean data, string data, or other data types, as desired, depending upon the defined type. Still further, it is noted that since each field is associated with a typed object, methods may be supported and selectively invoked via external stimuli to perform operations upon the data, as desired. Similarly, each entry type may support one or more methods, as described further below.

Referring back to FIG. 2, as described previously, each of the entry databases 206, 207 and 208 may store numerous entries of various types of subtypes. An entry may be stored within a given entry database 206–208 through a write operation invoked by a client. Entries may additionally be provided to an entry database via an installation media (e.g., installation media 126 of FIG. 1).

Figures 4, 5:
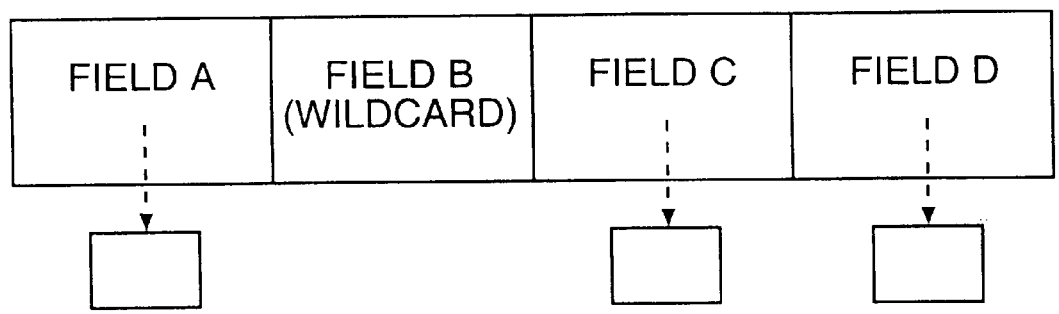
FIG. 4 is a diagram illustrating various operations supported by a database system consistent with the present invention.
FIG. 5 is a diagram illustrating an exemplary template entry consistent with the present invention.

Several additional operations are further supported by the system, as illustrated by FIG. 4. Specifically in addition to write operations, a client or user may initiate "read" operations, "take" operations, and "notify" operations.

Read, take, and notify operations are each used to query a particular entry database to determine whether an entry with certain specified characteristics has been written into an entry database and, if so, to cause a specific action. In one particular implementation, these queries are made through the use of templates included as part of the operation requests which define the type of entries which are of interest with respect to the operation. A read operation may be initiated to read an entry in an entry database which matches an associated template. A take operation is similar to a read; however, a take operation will remove an entry matching the template from the entry database. Finally, a notify operation registers interest in future incoming entries of a specified entry database that match the associated template. When matching entries arrive, the client or a specified event catcher is notified. Further details regarding each of these operations will be provided further below.

FIG. 5 depicts an exemplary template. Generally speaking, a template specifies a particular entry type whose fields can either have values (reference to objects) or "wildcards." When considering a particular entry in an entry database as a potential match against a template, the attributes of specified fields (i.e., those which do not correspond to wildcarded fields of the template) of the entry must exactly match the attributes (or fall within a range of possible attributes) specified by the corresponding field of the template. Fields of an entry which correspond to "wildcard" fields of the template may have any attributes and do not affect the matching outcome (i.e., wildcards in the template match any value in the same field of an entry). In one implementation, a wildcard is specified with a null reference value. As will be described further below, the type of an entry which matches a template may be a subtype of the type of the template. Thus, all fields of a particular entry which are defined by the subtype are considered to be wildcards. This enables a template to match entries of any subtype. It is noted that an entry having no wildcards may further be a valid template.

Figure 6:
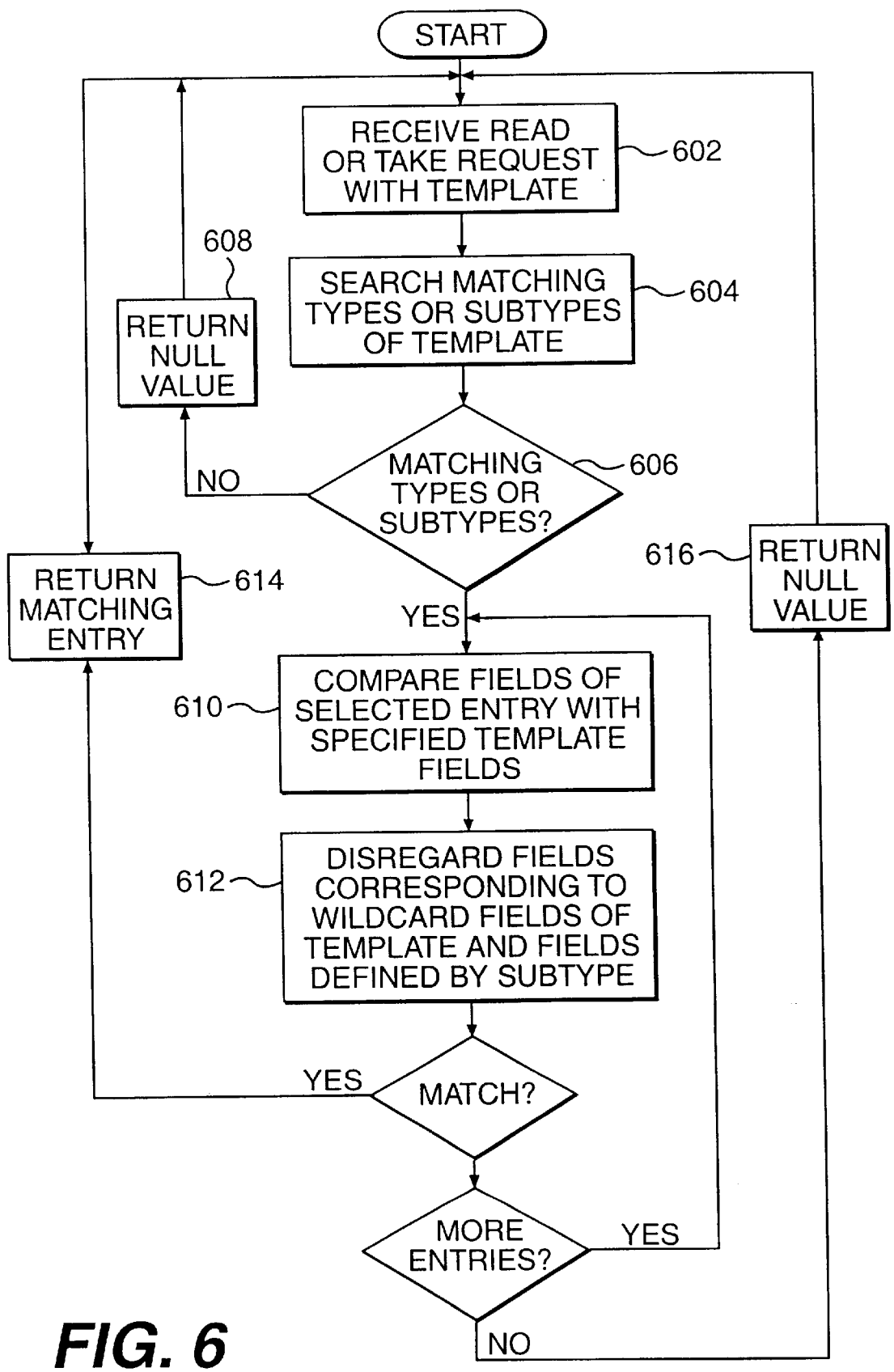
FIG. 6 is a flow diagram which depicts one implementation of a method for searching entries within a particular entry database in response to either a read request or a take request consistent with the present invention.

FIG. 6 is a flowchart which depicts one implementation of a method for searching entries within a particular entry database in response to either a read request or a take request consistent with the present invention. As stated previously, a read request may be initiated by a client (or user) to read an entry that matches a given template. A take request may be initiated to remove an entry matching the given template from an entry database.

(1) Method for Entry Matching

The steps illustrated in FIG. 6 will be described in conjunction with FIG. 7, which depicts functional aspects of a database system employing the search methodology of FIG. 6. The functional components of FIG. 7 may be implemented through a combination of software and hardware associated with one or more of the computer systems 101–103 of FIG. 1. During step 602, a read or take request is provided from a user 702 to a database manager 704. A given request will include a specified template, an exemplary one of which is shown as template 706 in FIG. 7. A search engine 708 of database manager 704 subsequently searches entry database 710 during step 604 to determine if any matching types or subtypes of the template reside within entry database 710. If no entries within entry databases 710 are of the same type or a subtype of the template (step 606), database manager 704 returns a null value to user 702 during step 608.

If the search engine 708 determines that there are one or more entries within entry database 710 that are matching types or subtypes of the template, it compares the fields of a selected entry (of the same type or a subtype) with the corresponding fields of template 706 which are not designated as wildcards (step 610). The search engine 708 disregards any fields of the selected entry which correspond to a wildcard field of the template (step 612). In one specific implementation, the search engine 708 determines whether the attributes or data associated with each non-wildcarded field of an entry exactly matches the attributes or data of the corresponding template entries. If the attributes of any field which is not a wildcard field do not exactly match those of the template, it is determined that a match with respect to that entry has not occurred. It is noted that in other embodiments, a field of the template may specify a range of values (rather than requiring an exact match) in which the data of a corresponding field must fall to result in a match.

(2) Example

Figure 7:
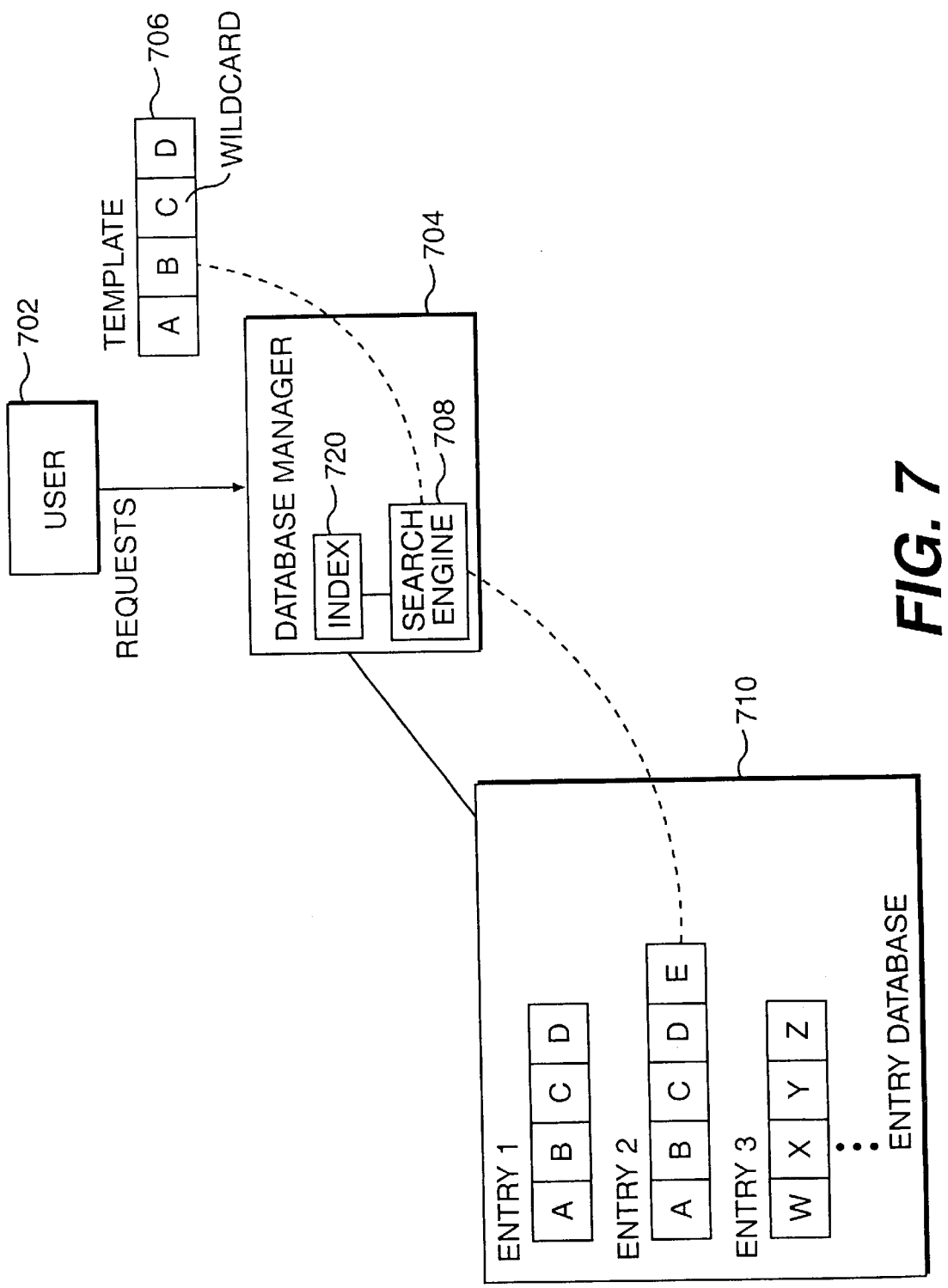
FIG. 7 is a functional block diagram illustrating aspects of a database system consistent with the present invention.

In the example illustrated by FIG. 7, field C of template 706 is specified as a wildcard. Thus, when the search engine 708 searches entry database 710 for a matching entry, the search engine 708 first determines whether any entries reside within the entry database 710 which are types or subtypes of the template 706. As shown, both entry 1 and entry 2 meet this qualification. The search engine 708 then selects one of these entries (such as entry 2, as depicted) and compares the fields of the entry to the fields of the template which are not specified as wildcards. The search engine 708 determines whether an exact match for each of the non-wildcard fields of the template occurs with respect to the attributes of each of the corresponding fields of the entry. It is noted that since field C of the template 706 of FIG. 7 is designated as a wildcard field, the attributes of field C of entry 2 are disregarded and do not affect the comparison operation. Similarly, those fields of any entry defined by a subtype of the template type are disregarded (i.e., a match may still occur even though the attributes of the wildcard fields do not match). If a matching entry is found (all non-wildcarded fields match), the search engine 708 either reads the matching entry from the entry database 710 and provides it to the user, or removes the entry from entry database 710, depending upon whether the request was a read request or a take request. The search engine 708 searches entry database 710 until either a match is found or until all of the entries have been checked. If no matching entries are found after a search of all entries in the database, database manager 704 returns a null value (step 616) to user 702.

(3) Notify

Figure 8:
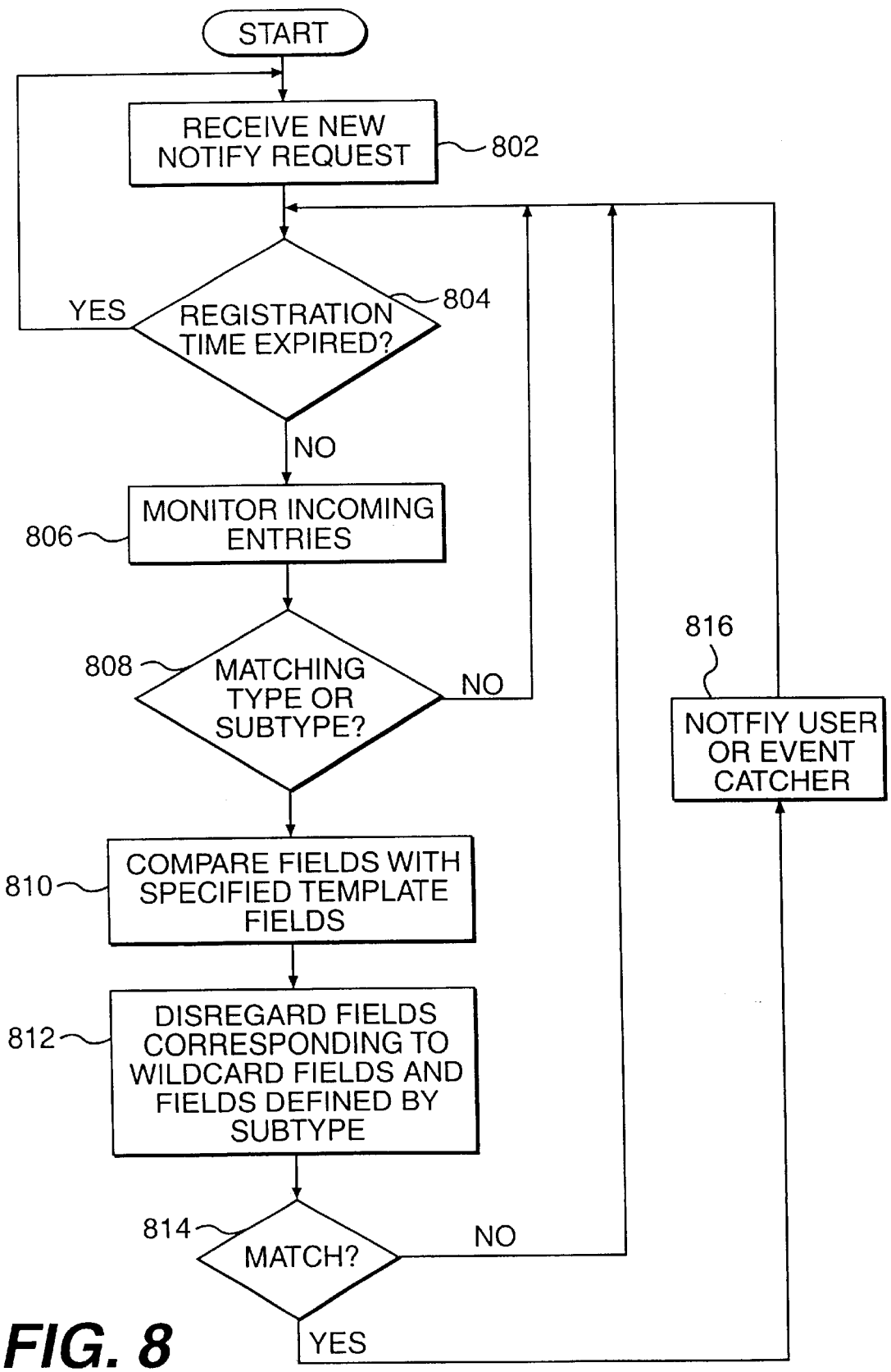
FIG. 8 is a flow diagram which illustrates an implementation of a search methodology to process a notify request consistent with the present invention.

Turning next to FIG. 8, a flow diagram is shown which illustrates one implementation of a methodology implemented by the search engine 708 to process a notify request received from a user consistent with the present invention. As stated previously, a notify request may be issued by the user to register interest in future incoming entries which match a template. When matching entries arrive, the database manager either notifies the user or an event catcher (FIG. 2), as desired. When a user invokes a notify request, a lease time is specified which indicates how long the database manager 704 will register the notification. After the specified time has elapsed, the notify registration is canceled.

Thus, as depicted in FIG. 8, when database manager 704 receives a new notify request (step 802), incoming entries are monitored until the registration time expires (steps 804 and 806). If an entry is written into entry database 710 which is a type or a subtype of the template (step 808), the fields of the entry are compared to determine whether their attributes match the attributes associated with the non-wildcard fields of the template (step 810). Similar to the previous discussion, fields of an incoming entry which are wildcarded or which are defined by a subtype of the template entry are disregarded (step 812). If a match occurs, the user or an event catcher is notified (steps 814 and 816). Additional incoming entries continue to be monitored as long as the registration time has not expired.

(4) Indexing

Turning back to FIG. 7, the search engine 708 may further be configured to create an index for entries having characteristics which are commonly specified by queries received by database manager 704. That is, the search engine 708 may detect a pattern of usage and create an index 720 which points to entries having attributes which are commonly specified by received templates. As an example, consider a situation in which database manager 704 receives several query requests each using templates which are of the same type or a subtype of the template 706 illustrated in FIG. 7. In this situation, the search engine 708 may detect that the same attribute value for field A (such as an integer value 1,000), is specified in each of the templates of the numerous requests. In one implementation, database manager 704 is configured to detect such a common template usage specified by many queries and to responsively create an index 720 which points to all entries within entry database 710 which are the same type or a subtype of the commonly received template and which all have the common attribute specified for field A. Consequently, when a new query with a similar template is received (that is, a template which again specifies the value 1,000 for field A), the search engine 708 may use index 720 to quickly locate the subset of entries which might match the template, without searching through the entire set of entries in the database.

Figure 9A:
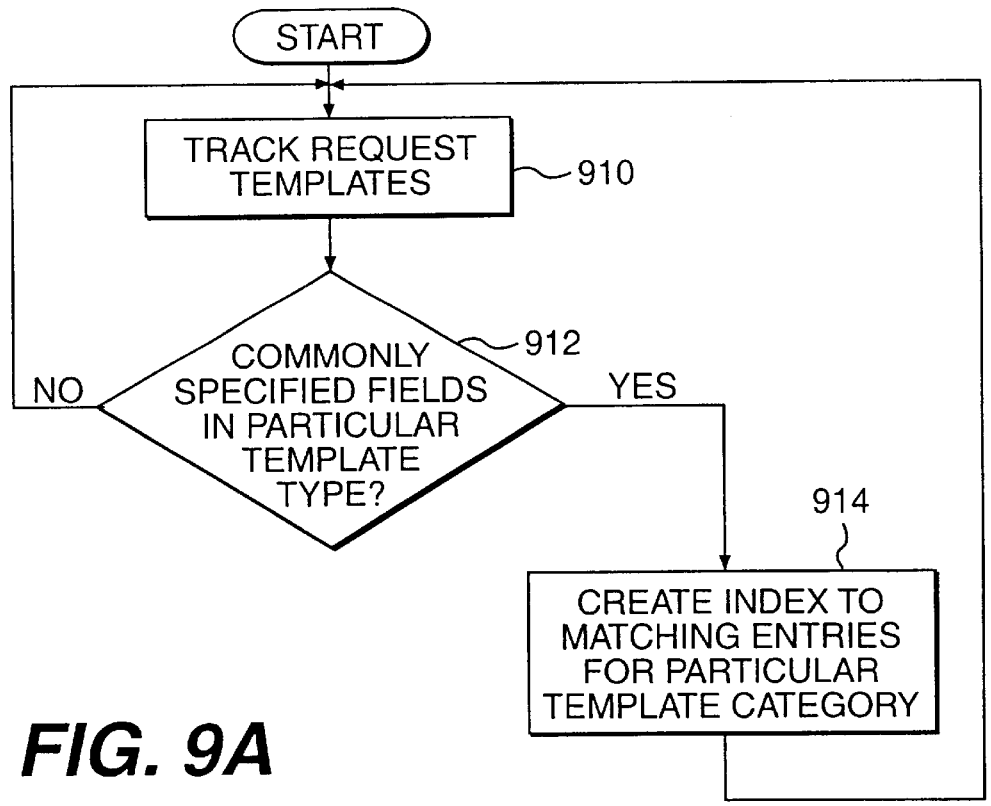
FIGS. 9A and 9B depict an implementation of an indexing methodology consistent with the present invention.
Figure 9B:
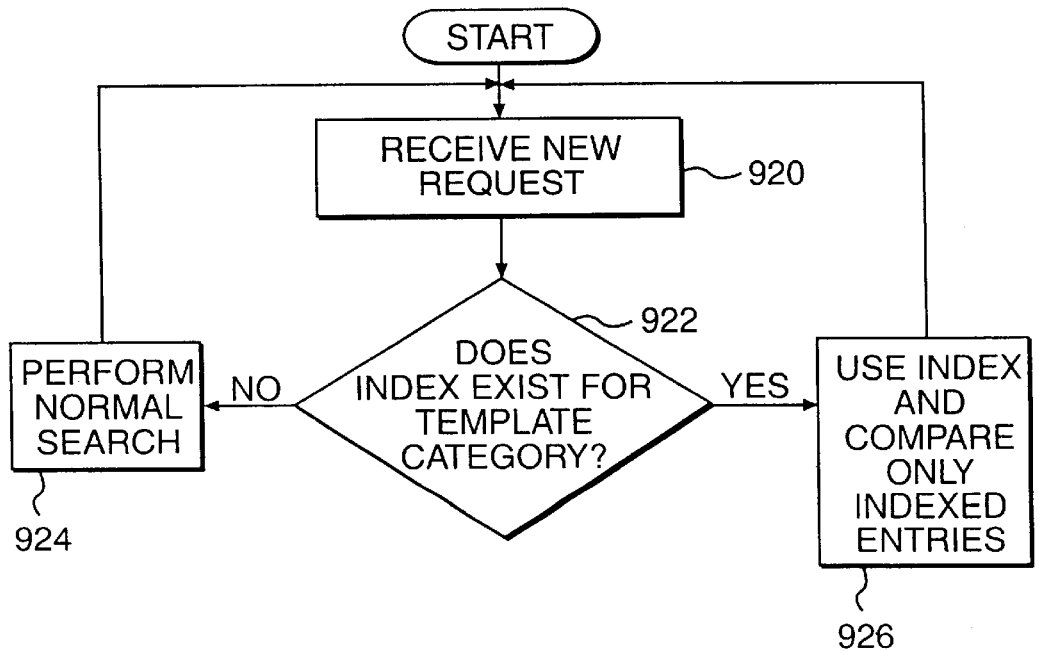

An implementation of the indexing methodology is illustrated in FIGS. 9A and 9B. As illustrated in FIG. 9A, an index to entries corresponding to a particular template category may be created by tracking request templates (step 910) and determining if there is a pattern associated with the templates (e.g., templates in which a particular non-wildcarded field (or fields) is specified with the same attribute or value (step 912). This determination may be made, for example, based on receiving a predetermined number of queries within a particular time which have similar templates, or based upon receiving a certain percentage of queries which have similar templates. When the search engine 708 detects common template usage pattern, it creates an index to the entries which are of the particular template category (step 914). Thus, considering the above example, the search engine 708 may create an index to all entries of the same type or subtype as template 706 with field A value of 1,000.

As depicted in FIG. 9B, if a new request is received during step 920, a normal search is performed if an index does not exist for that particular template category (steps 922 and 924). If an index category exists for the template of the new request, the index is used to find the subset of potentially matching entries and compares only those entries. In this manner, expedient entry searching may be accommodated. It is noted that the search engine 708 may subsequently delete certain indexes if the common usage is no longer detected, as desired.

As stated previously, an entry type may further define a method which may be invoked by external stimuli (e.g., a software program associated with the database system that processes the entries) to cause a specific action to occur. Such specific actions might affect data residing in the entry. In addition, a method may be utilized to allow efficient equivalence checking to determine if a particular entry is equivalent to another (or equivalent to a template), even though the form of the data may be different. For example, an entry that stores decompressed video data might be considered an equivalent to another entry storing a compressed form of the video data. A method may be provided to determine such entry equivalence, even though the actual stored data is different (e.g., a method may be invoked to determine whether the objects refer to the same underlying pathname in the file system associated with the image).

It is further noted that entries may be stored in an implementation-specific representation that includes a serialized form of an entry's class and each of the entry's fields. Serialized forms of a template may then be compared against the serialized forms of the entries. It is finally noted that an entry may be specified by the field of another entry.

Multi-Entry and Multi-Template Matching

An alternative embodiment implements operations and matching of items in the database, each item defining a set of entries. An "item" is referred to herein as a "multi-entry"; "multi-template" (or "item template") is the term used to refer to a set of templates, which are used to match items in the database. This section will further describe the matching of multi-entries to multi-templates and operations involving multi-entries and multi-templates. Much of the behavior of multi-entries and multi-templates is similar to single entry and template behavior as discussed previously.

FIG. 10 is a diagram illustrating a plurality of exemplary multi-entries which may be stored in any of the entry databases 206–208. In methods and systems consistent with the present invention, each multi-entry is a group of entries, each entry being a typed group of objects expressed, for example, in a Java™ class of the Java™ programming language. In other words, a multi-entry is set of entries and has no type of its own.

Referring to FIG. 10, multi-entry 1 illustratively includes a set of four elements (element A, element B, element C and element D). Whereas multi-entries may be of varying length, the exemplary multi-entry 2 includes a set of five elements (element E, element F, element G, element H and element I), and the exemplary multi-entry 3 includes a set of three elements (element J, element K, and element L). Each of the elements of the multi-entries is configured to store typed entries. As stated, each of these typed entries may be expressed in a Java™ class, and the fields of the entries store values which identify typed objects. For example, element A of multi-entry 1 contains a value identifying entry 1010, and element B of multi-entry 1 identifies an entry 1012. Similarly, element E of multi-entry 2 identifies an entry 1014, and element F identifies an entry 1016, and so on. It is noted that for the exemplary multi-entries of FIG. 10, while any entries may be of the same type, the attributes or data associated with the fields of the entries, however, may differ. It is further noted that although the entries identified by the elements of various multi-entries have a specified type, the multi-entries are simply sets of entries and themselves have no specific type.

Since multi-entries and multi-templates are just sets, they can be represented using any suitable representation of a set. For purposes of example only, a suitable representation in many programming languages, including the Java programming language, is an array, where the size of the array is given by the number of entries in the multi-entry or the number of templates in the multi-template, and each element of the array is an entry (in the case of multi-entries) or a template (in the case of multi-templates).

Figures 11, 12:
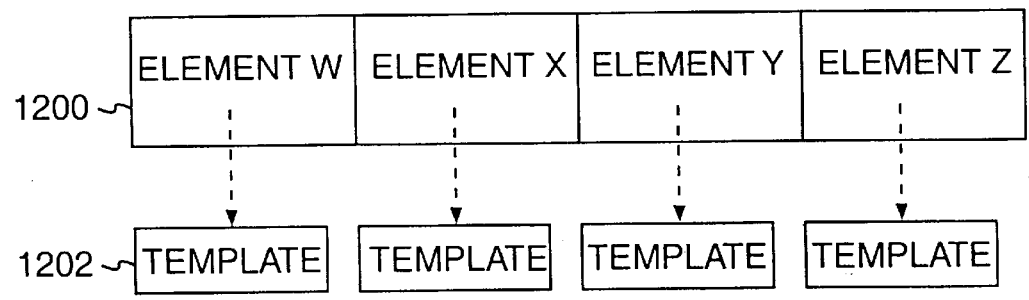
FIG. 11 is a diagram illustrating various multi-entry operations supported by a database system consistent with the present invention.
FIG. 12 is a diagram illustrating an exemplary multi-template consistent with the present invention.

Referring back to FIG. 2, as described previously, each of the entry databases 206, 207 and 208 may store numerous multi-entries. A multi-entry may be stored within a given entry database 206–208 through a write operation invoked by a client. Multi-entries may additionally be provided to an entry database via an installation media (e.g., installation media 126 of FIG. 1). Several additional operations, similar to single entry operations, are further supported by the system, as illustrated by FIG. 11. Specifically in addition to write operations, a client or user may initiate "read" operations, "take" operations, and "notify" operations.

Read, take, and notify operations operate on multi-entries in the same manner as they operate on single entries. In one particular implementation, these queries are made through the use of multi-templates included as part of the operation requests which define which multi-entries are of interest with respect to the operation. As in the single entry implementation, the read operation reads multi-entries in the database that match the given multi-template. Once again, the take operation performs the same function as the read operation but also removes any multi-entry read from the database. Used to register interest in future multi-entries, the notify operation notifies the client or an event catcher when matching multi-entries arrive in the database.

FIG. 12 depicts an exemplary multi-template. Generally speaking, a multi-template specifies a particular multi-entry whose elements contain templates as previously defined. The multi-template 1200 shown in FIG. 12 has four elements, W, X, Y and Z, although it should be noted that multi-templates can have any number of elements, but, in an exemplary embodiment of the present invention, each element in a multi-template 1200 includes one template 1202.

(1) Method for Multi-Entry and Multi-Template Matching

Generally, a multi-template will match a multi-entry if each template in the multi-template has a matching entry in the multi-entry. Each entry in the multi-entry can be used to match more than one template in the multi-template. For example, a single entry in the multi-entry could match all the templates in the multi-template, thus creating a match between the multi-entry and the multi-template. In the process of determining whether a multi-entry matches a multi-template, it is necessary to compare the individual entries of the multi-entry with the individual templates in the multi-template. This matching of individual templates in a multi-template to individual entries in a multi-entry is performed in the same manner as the matching of single entries to single templates as previously defined.

Figure 13:
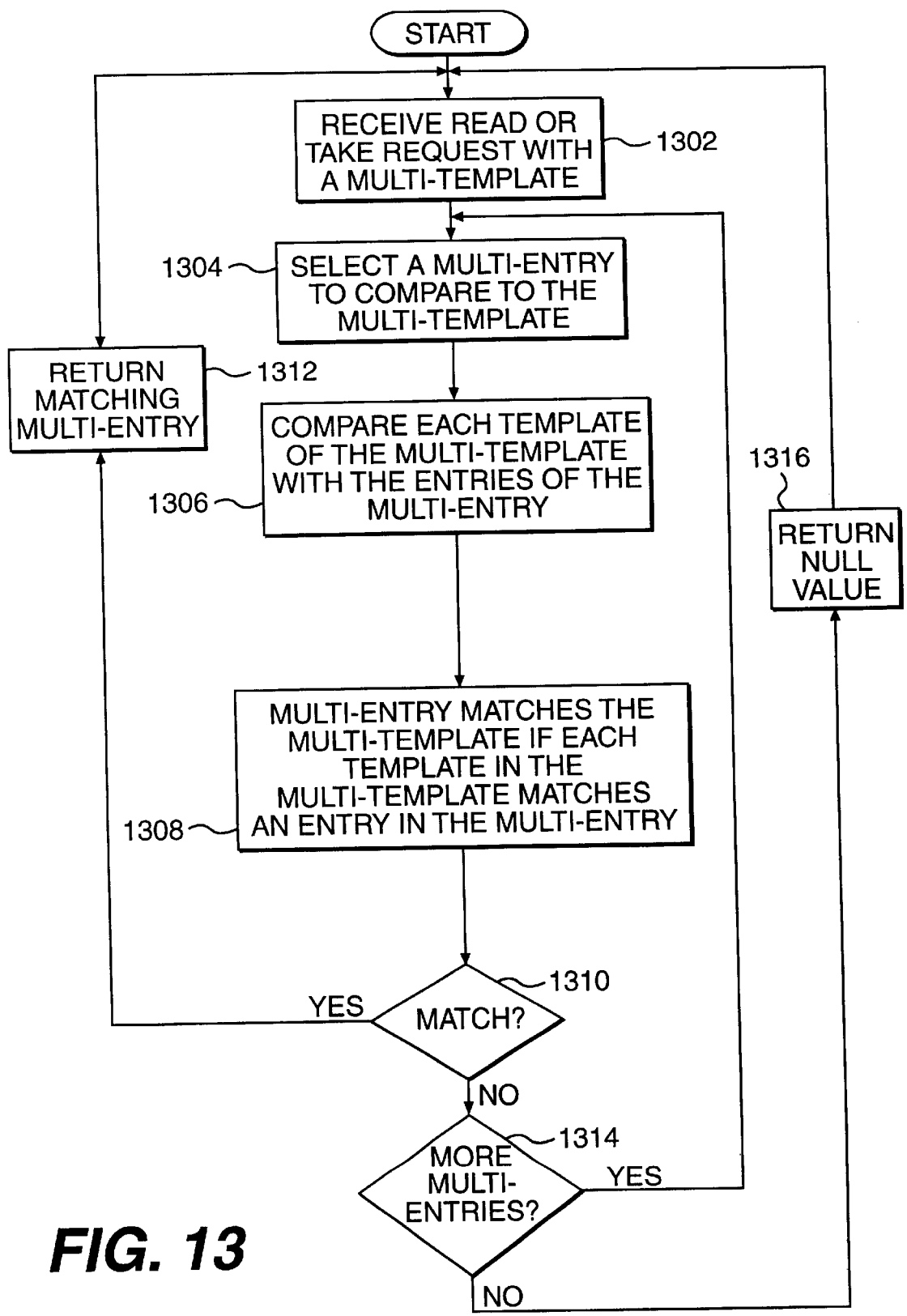
FIG. 13 is a flowchart depicting a method of searching a database for multi-entries consistent with the present invention.

FIG. 13 is a flowchart which depicts one implementation of a method for searching multi-entries within a particular entry database in response to either a read request or a take request. The steps illustrated in FIG. 13 will be described in conjunction with FIG. 14, which depicts functional aspects of a database system employing the search methodology of FIG. 13. The functional components of FIG. 14 may be implemented through a combination of software and hardware associated with one or more of the computer systems 101–103 of FIG. 1. During step 1302, a read or take request is provided from a user 702 to a database manager 704. A given request will include a specified multi-template, an exemplary one of which is shown as multi-template 1200 in FIG. 14. A search engine 708 of database manager 704 subsequently searches entry database 710 to determine if any matching multi-entries of the multi-template reside within entry database 710.

To search the entry database 710, the search engine 708 selects a multi-entry in the entry database 710 to compare to the given multi-template (step 1304). Then, to determine if the multi-entry matches the specified multi-template, the search engine 708 compares each template in the multi-template to the entries of the multi-entry (step 1306). If there is a matching entry for each and every template in the multi-template, the multi-entry matches the multi-template (step 1308). Each entry in the multi-entry can be used to match more than one template in the multi-template. If it is determined that every template in the multi-template has a matching entry in the multi-entry (step 1310), the multi-template matches the multi-entry, and the multi-entry is returned (step 1312). This process continues until all entries in the database have been examined.

If a match is not made between the selected multi-entry and the multi-template supplied by the operation, the search engine 708 searches other multi-entries in the entry database 710 (step 1314). If no multi-entries are found in the database to match the multi-template, a null value is returned (step 1316). If more than one is found, in one implementation, one multi-entry is returned, and in another implementation, a requested number of matching multi-entries are returned. If the original request from the client arrived in the form of a take request, the matching multi-entry is removed from the database. However, if the original request arrived as a read request, the matching multi-entry is not removed from the database.

(2) Example

Figure 14:
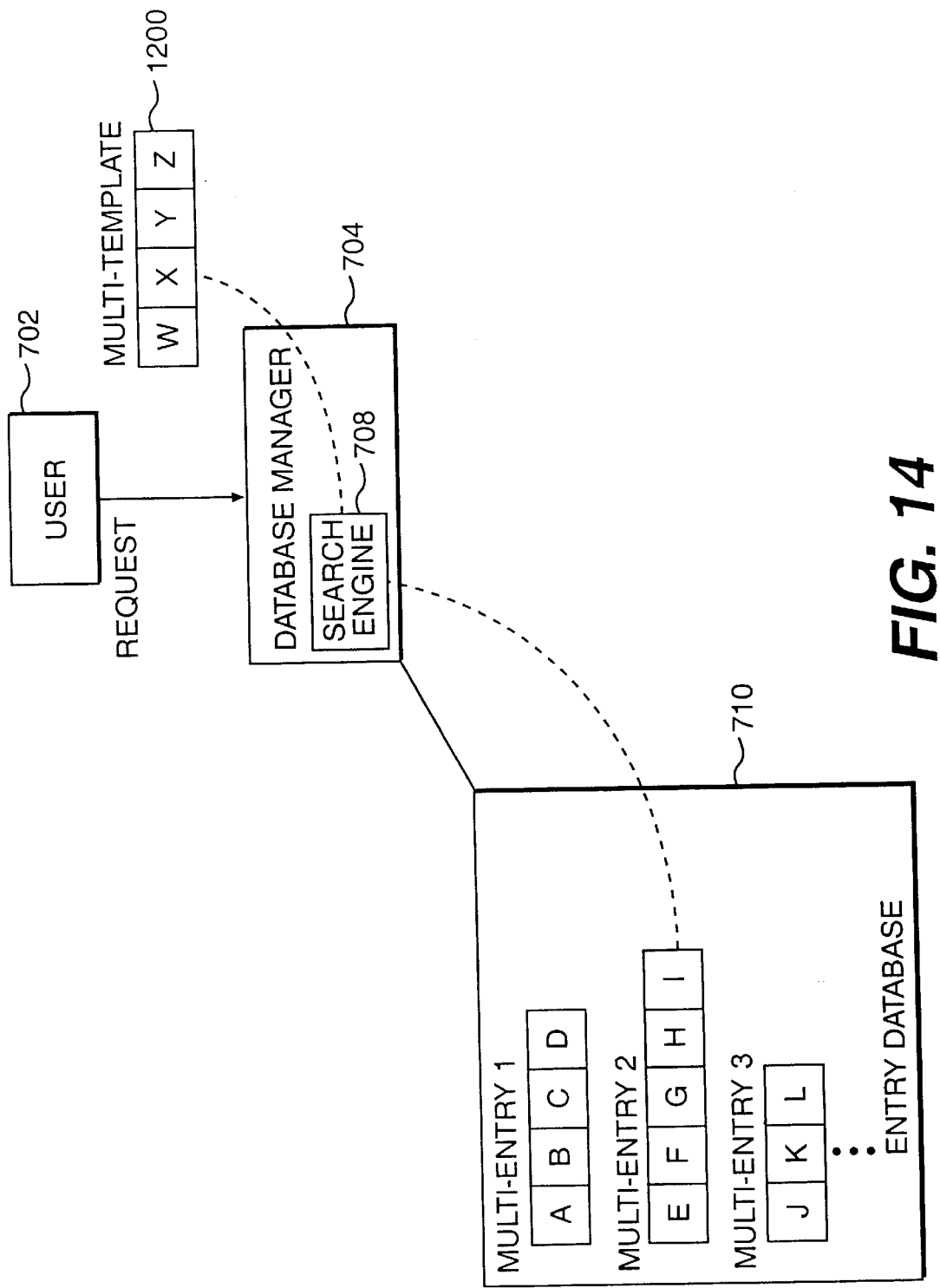
FIG. 14 is a functional diagram illustrating aspects of a database system in relation to an example of a multi-entry search consistent with the present invention.

In the example illustrated by FIG. 14, the search engine 708 selects one of the multi-entries (such as multi-entry 2, as depicted) and compares the entries of the multi-entry to the templates of the multi-template. In this example, the search engine 708 receives a request including the multi-template 1200.

The search engine 708 determines whether the templates in the multi-template 1200 match the entries of the selected multi-entry in the entry database 710. The search engine 708 compares the template in element W of the multi-template 1200 to the entries in elements E, F, G and H and I of the multi-entry 2 in the entry database 710 to determine whether any of these entries match the template. If the search engine 708 finds a match for the template in element W of multi-template 1200, it can then attempt to find a match for the template in element X of multi-template 1,200. It will compare the template in element X of the multi-template 1200, once again, to each of the entries in the multi-entry 2 until it finds a match. It should be noted that even though each of these entries in elements E, F, G, H and I may have been compared to other templates in the multi-template (i.e., the template in element W), they can be compared again to this template. If a match is found for the template in element X, the search engine 708 checks the rest of the templates in the multi-template 1200 (the templates in elements Y and Z) in the same manner. Since each entry can be compared to more than one template, the entry in element E of multi-entry 2 could, for example, match all of the templates in the elements W, X, Y and Z of the multi-template 1200. If each template in the multi-template 1200 has a matching entry in multi-entry 2, the multi-entry 2 matches the multi-template 1200.

As with single entry operations, if a matching multi-entry is found, the search engine 708 either reads or removes the matching multi-entry from the entry database 710 and provides it to the user, depending upon whether the request was a read request or a take request. The search engine 708 continues searching the entry database 710 until either a match is found or all of the multi-entries have been checked. If no matching multi-entries are found after a search of all multi-entries in the entry database 710, the database manager 704 returns a null value to user 702.

(3) Notification

Figure 15:
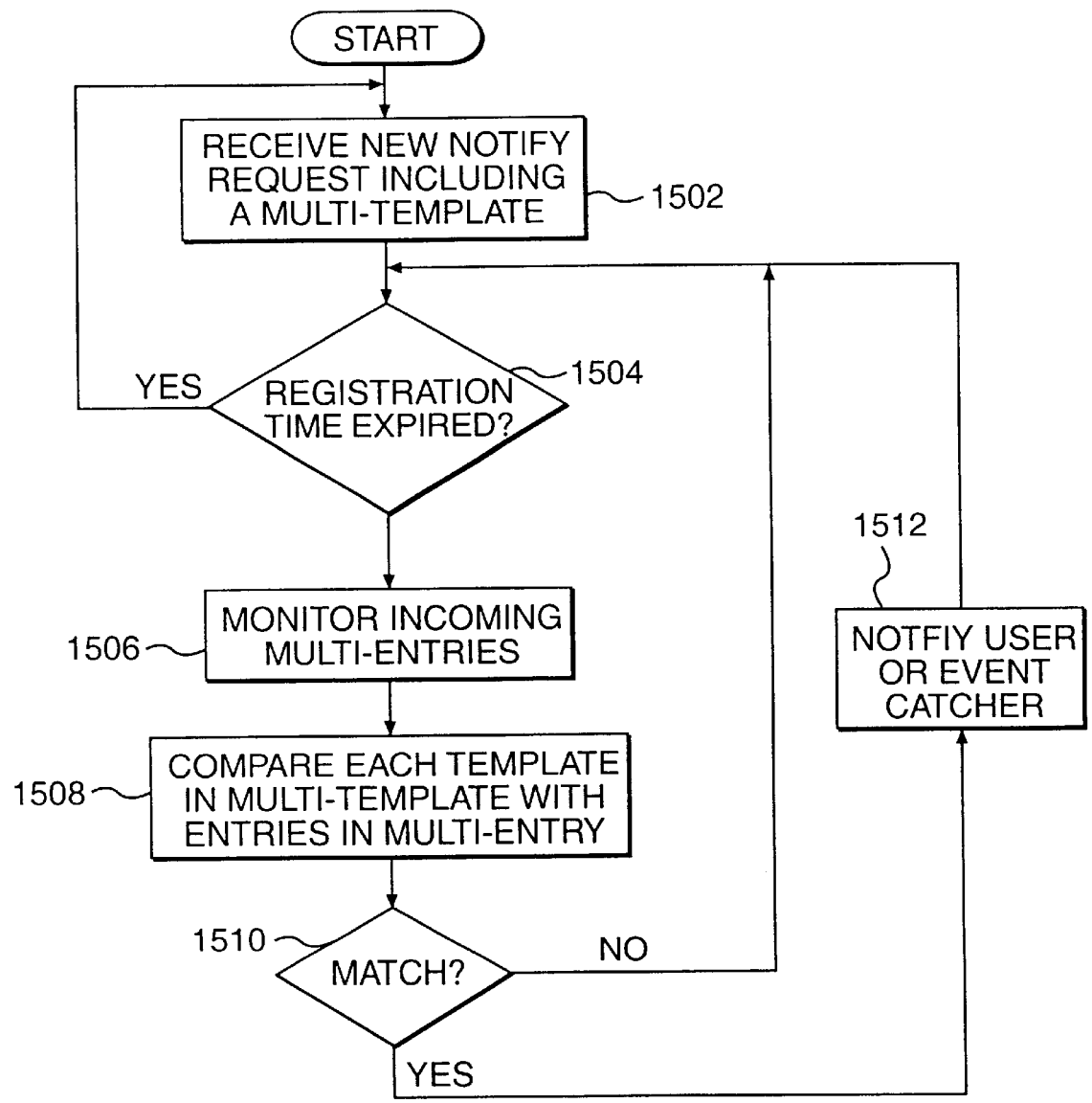
FIG. 15 is a flowchart which illustrates an implementation consistent with the present invention of a search methodology to process a notify request for multi-entries.

Turning next to FIG. 15, a flowchart is shown which illustrates one implementation of a methodology implemented by search engine 708 to process a notify request received from a user. The notification operation works similarly to the notification for single entries, and as stated previously, a notify request may be issued by the user to register interest in future incoming multi-entries which match a multi-template. When matching multi-entries arrive, the database manager 704 either notifies the user or an event catcher (FIG. 2), as desired. When a user invokes a notify request, a lease time is specified which indicates how long the database manager 704 will register the notification. After the specified time has elapsed, the notify registration is canceled.

Thus, as depicted in FIG. 15, when database manager 704 receives a new notify request (step 1502), incoming multi-entries are monitored until the registration time expires (steps 1504 and 1506). If a multi-entry is written into entry database 710, the search engine 708 determines whether the multi-entry matches the multi-template. Similar to the previous discussion, if each template of the multi-template has a matching entry in the multi-entry (steps 1508 and 1510), a match occurs and the user or the event catcher is notified (step 1512). Additional incoming multi-entries continue to be monitored as long as the registration time has not expired (step 1504).

In-Place Entry Modifications

An alternative embodiment additionally implements modifications of entries and multi-entries in place in the database. Consistent with the present invention, this implementation is an extension to the entry/template and multi-entry/multi-template scenario in which the fields of entries can be modified in place in the database, and in the multi-entry case, entries within a multi-entry can be added, modified or deleted. The term "in-place" means that the modification occurs in the database without removing the entries or multi-entries from the database.

Figure 16:
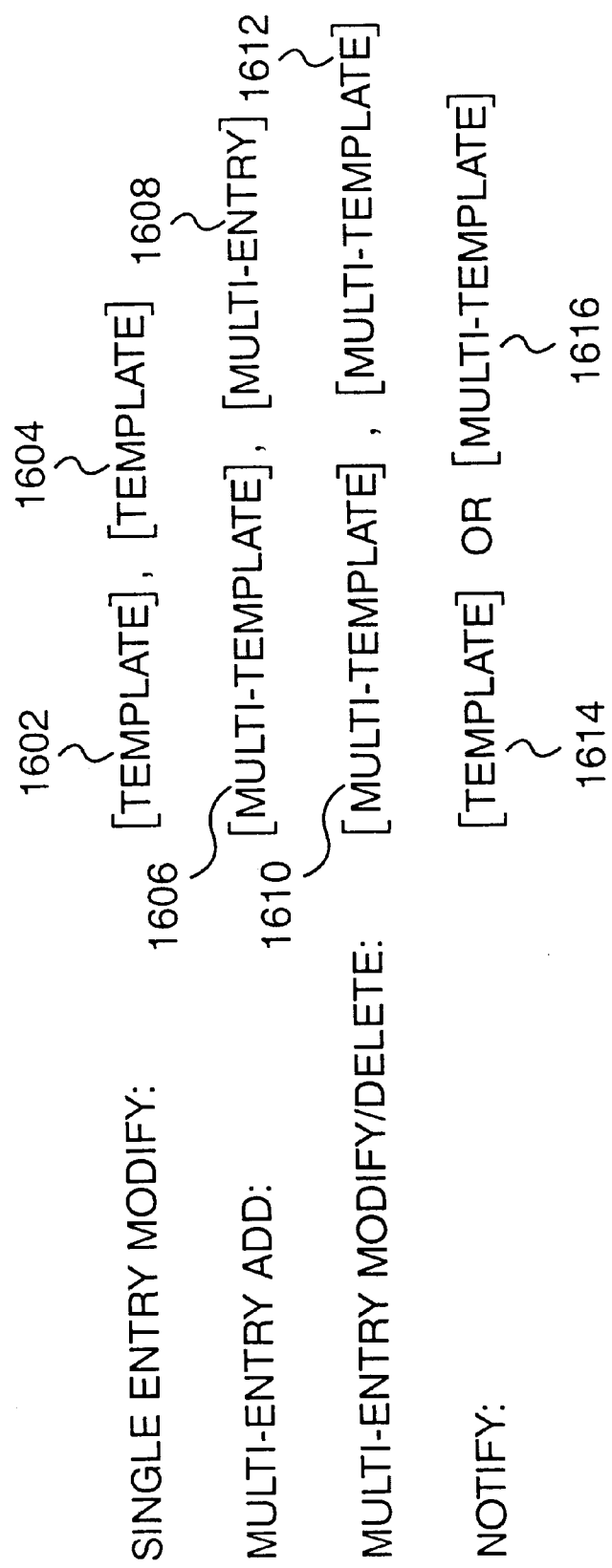
FIG. 16 is a diagram illustrating various operations to modify entries and multi-entries in place in the database consistent with the present invention.

In-place modification operations consistent with this implementation of the present invention include a "single entry modify," a "multi-entry add," a "multi-entry modified/delete," and a "notify." FIG. 16 illustrates these in-place modifications and the information supplied by a user to request a modification. The single entry modify operation changes the values in the individual fields of a entries in the database. The multi-entry add operation adds entries to multi-entries existing in the database, and the multi-entry modified/delete changes or deletes entries in multi-entries in the database. The notify operation, with respect to in-place modifications, notifies of a match occurring due to a change in an entry or multi-entry in the database. Generally, the first parameter of an operation request, as shown in FIG. 16, specifies which entries or multi-entries in the database are to be modified, and the second parameter specifies the modifications to be made.

(1) Single Entry Modify

Figure 17:
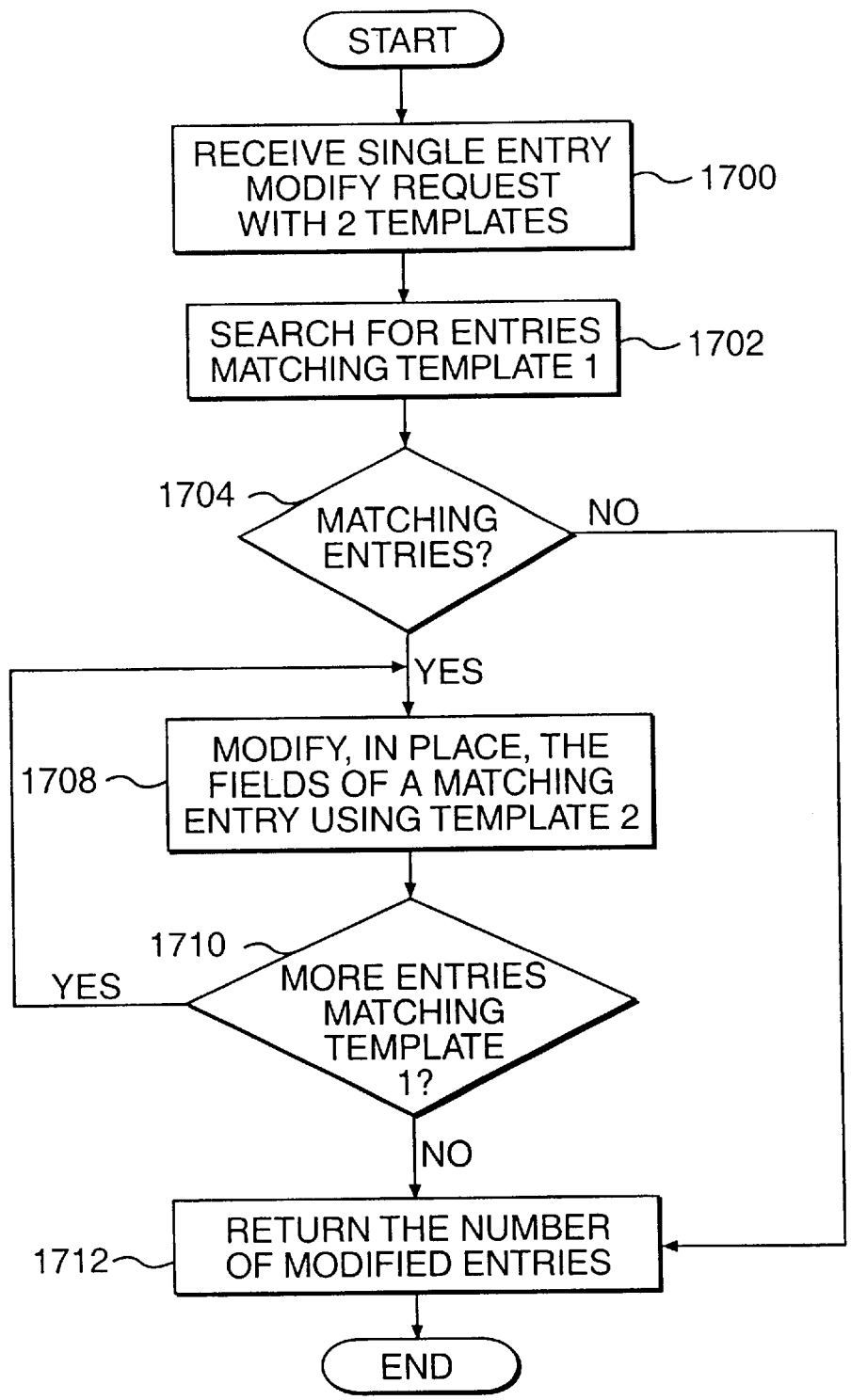
FIG. 17 is a flowchart illustrating steps of a single entry modify operation consistent with the present invention.

FIG. 17 depicts a flowchart illustrating an implementation of a single entry modify operation consistent with the present invention. Further reference will also be made back to FIG. 7 for structural aspects. To invoke a single entry modify operation to change the values of individual fields in an entry, a user 702 makes a request including two templates (step 1700, see also FIG. 16). The first template 1602 is used to identify the entries in the database to be modified while the second template 1604 is used to modify the entries and identifies the modifications to be made. Since these two templates operate on the same entry by identifying it and modifying it, the second template 1604 is the same type as, or a supertype of, the first template 1602. In certain implementations, the single entry modify procedure may include a type checking of the templates.

First, the search engine 708 searches for entries in the entry database 710 matching the first template 1602 received in the request from the user 702 (step 1702). When comparing the entries in the database to the first template, the matching is done according to the single entry and template matching as discussed above. If there are no entries in the entry database 710 matching the first template 1602 (step 1704), the search engine 708 returns a zero to the user 702 representing the number of entries changed due to this operation (step 1712).

If a matching entry is found, the second template 1604 is used to modify the entry in place in the database, i.e., the entry is not removed from the database for modification. Because the second template 1604 is the same type as, or a supertype of, the first template 1602 and the first template 1602 is the same type as, or a supertype of, the entry being modified, therefore the second template 1604 is also the same type as, or a supertype of, the entry being modified, and so the second template 1604 has the same, or a subset of, fields of the entry being modified. To modify the matching entry, the values in the non-null fields of the second template 1604 are used to replace the values in the corresponding fields of the entry (step 1708). The value of the fields of the entry corresponding to the null or wildcard fields of the second template 1604 remain unchanged. After the modification of an entry in the database, the search engine 708 continues searching for more entries to be modified. If there are any more entries in database matching the first template 1602 (step 1710), those entries are modified in the same manner (step 1708). Upon completion, the search engine 708 returns a number representing the number of entries modified by the operation (step 1712).

(2) Multi-Entry Add

Figure 18:
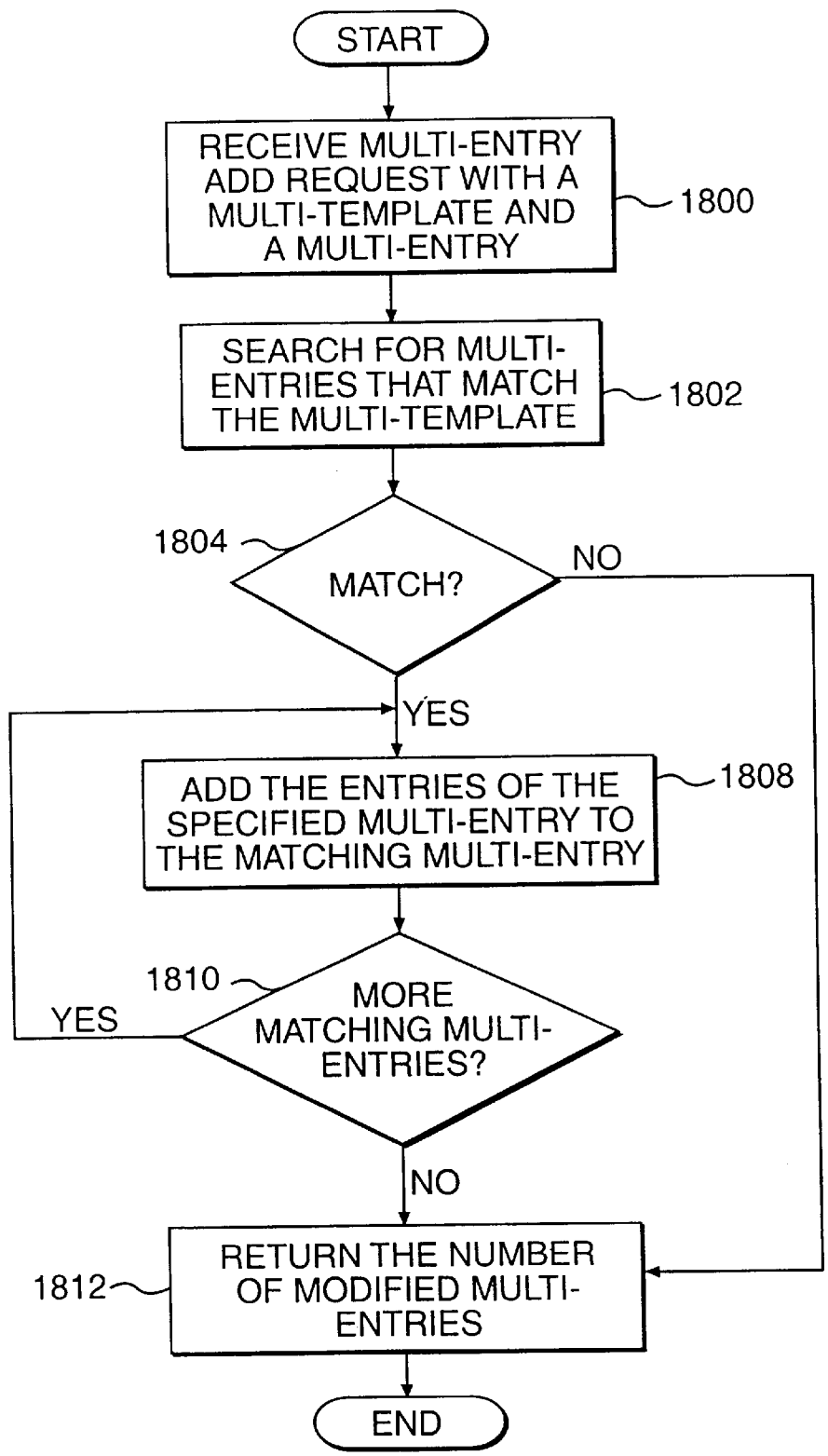
FIG. 18 is a flowchart illustrating steps of a multi-entry add operation consistent with the present invention.

FIG. 18 is a flowchart illustrating steps of a multi-entry add operation consistent with the present invention. Generally, the multi-entry add operation adds entries to specified multi-entries in the database. A user 702 requesting this operation supplies two parameters to the search engine 708, a multi-template 1606 and a multi-entry 1608 (see FIG. 16). The first parameter, the multi-template 1606, is used to identify multi-entries in the entry database to be changed; the second parameter, the multi-entry 1608, is a set of entries to be added to the identified multi-entries database. Using multi-entry/multi-template matching as previously discussed, the search engine 708 searches for multi-entries in the database that match the multi-template 1606 given by the user 702 (step 1802). If no matching multi-entry is found (step 1804), the search engine 708 returns a zero to the user 702 representing the number of multi-entries to which entries were added (step 1812).

If a matching multi-entry is found (step 1804), the entries of the specified multi-entry 1608 supplied by the user 702 are added to the matching multi-entry found in the entry database 710 without the removal of the matching multi-entry from the entry database 710 (step 1808). After adding to a multi-entry in the database, the search engine 708 continues searching for more multi-entries to change. If there are more multi-entries in the entry database 710 that match the multi-template 1606 given as the first parameter in the operation request (step 1810), the entries of the multi-entry 1608 in the operation request are added to these multi-entries in the same manner (step 1808). Finally, the search engine 708 returns a number representing the number of multi-entries to which entries were added (step 1812).

(3) Multi-Entry Modify/Delete

Figure 19:
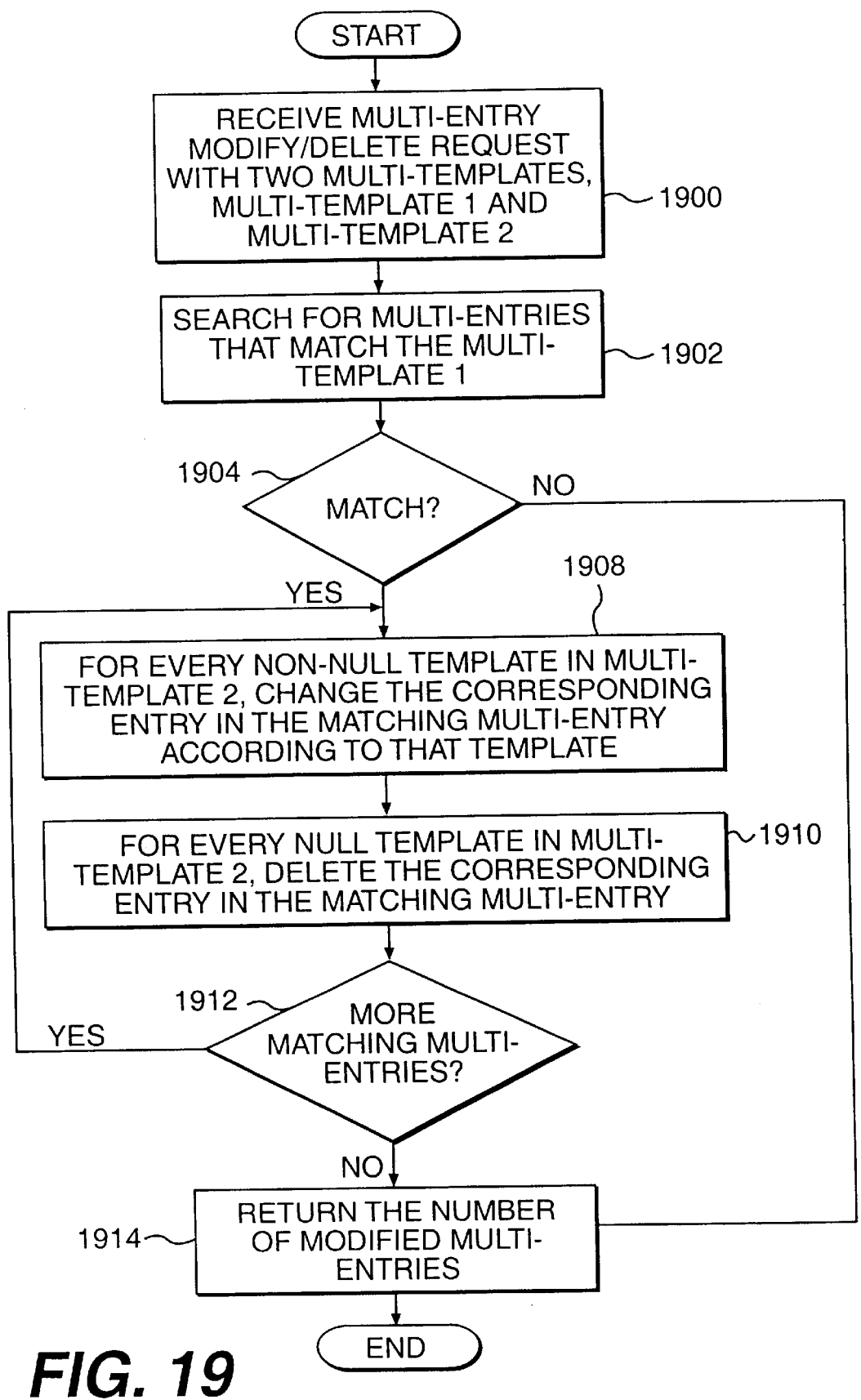
FIG. 19 is a flowchart illustrating steps of a multi-entry modify/delete operation consistent with the present invention.

FIG. 19 is a flowchart illustrating a method of implementing a multi-entry modify/delete operation consistent with the present invention. The multi-entry modify/delete operation either modifies entries in multi-entries in the database or deletes entries from multi-entries from the database, depending on the entries in the multi-entry in the request. When the search engine 708 receives a multi-entry modify/delete request, the request includes two multi-templates, a multi-template 1610 and a multi-template 1612, as its two parameters (step 1900, see also FIG. 16). The multi-template 1610 is used to identify the multi-entries in the entry database 710 that are to be modified or have entries deleted, while the multi-template 1612 supplied by the user 702 specifies the modification and deletions to be made to the entries in a matching multi-entry.

The multi-template 1612, given in the request, contains the same number of templates as the multi-template 1610. Furthermore, each individual template in the multi-template 1612 is the, same type, or a supertype of, as the corresponding template in the multi-template 1610 (i.e. every template (i) in multi-template 1612 is the same type as, or a supertype of, template (i) in multi-template 1610). For instance, the first template in the multi-template 1612 is the same type as, or a supertype of, the first template in the multi-template 1610, the second template is the same type as, or a supertype of, the corresponding second template and so on. Differing from a common multi-template, the templates in the multi-template 1612 of the request parameter may also be null values, and these templates will be used to designate deletions from a multi-entry as described below.

The search engine 708 first searches for multi-entries matching the multi-template given as the first parameter in the operation request (step 1902). If no match is found, a zero is returned representing the number of multi-entries that were modified (step 1914).

If a matching multi-entry is found in the entry database 710, it is modified using the multi-template 1612 from the operation request. To accomplish this modification, for each non-null template in the multi-template 1612, the corresponding entry in the matching multi-entry in the entry database 710 is changed according to the non-null template in multi-template 1612 (step 1908). This change is performed by using single entry modification as discussed above, and the modification occurs in place in the entry database 710 without removing the matching multi-entry. For example, if template (i) in the multi-template 1612 is non-null, the entry (i) in the multi-entry being altered is modified according to template (i) in multi-template 1612 using single entry modification (step 1708 of FIG. 17, where template (i) in multi-template 1612 is used as template 2). The values of the non-null fields of the template (i) are used to replace the values in the corresponding fields of the existing entry being modified.

For every null template in the given multi-template 1612, the corresponding entry in the matching multi-entry is deleted (i.e., for every template (i) in the multi-template 1612 that is null, entry (i) in the multi-entry to be modified is deleted) (step 1910). If there are more multi-entries in the database that match the multi-template 1610, these steps are repeated to modify the remaining matching multi-entries in the entry database 710 (step 1912). When the search engine 708 completes the modifications, it returns a number representing the number of multi-entries that were modified (step 1914).

An exception case arises, however, when dealing with the multi-entry modify/delete operation. In multi-entry/multi-template matching, because an entry in a multi-entry may be used to match more than one template in a multi-template, a multi-entry may match a multi-template and have less entries than the multi-template has templates. If such a multi-entry matches the multi-template 1610 and is to be modified by the modify/delete operation consistent with the present invention, more than one template in the multi-template 1612 will be used to modify or delete a single entry in the multi-entry to be modified. In this case, if any such template in the multi-template 1612 (i.e., templates corresponding to templates of the multi-template 1610 that match the entry of the multi-entry to be modified) indicates a delete operation (i.e., is null), then the entry in the multi-entry to be modified is deleted. Otherwise, if all such templates in the multi-template 1612 indicate modify operations, then all of the templates are used for modification, but the decision on the order in which to apply the modifications will be implementation specific and does not have any significant bearing on the modify/delete operation as a whole.

(4) Modification Notification

Regarding in-place modifications, in another implementation consistent with the present invention, a user can register interest in entries or multi-entries in the database and receive notification back to the user or an event catcher as before. In this implementation, when a user registers interest in entries or multi-entries in a database by supplying a template or multi-template, the search engine 708 does not monitor incoming entries or multi-entries as previously done. When implementing notification of in-place modifications, it monitors entries or multi-entries that have been changed or modified in the database. The monitoring of modified entries or multi-entries in the database as opposed to incoming entries to the database is the main difference between the previous notification operation and the present notification operation relating to in-place modification. However, many of the basic aspects of the notification remain the same.

Generally, a template 1614 or multi-template 1616 is used to register interest in changing entries and multi-entries. Upon the changing of a multi-entry or entry during an in-place modification, the search engine 708 checks to determine if the changed entry or multi-entry now matches the registered template or multi-template, or if the changed multi-entry or entry transitioned from matching the template or multi-template to not matching the template or multi-template. Hence, the notification operation searches for transitions in matching status, either from matching to not matching or not matching to matching.

Figure 20:
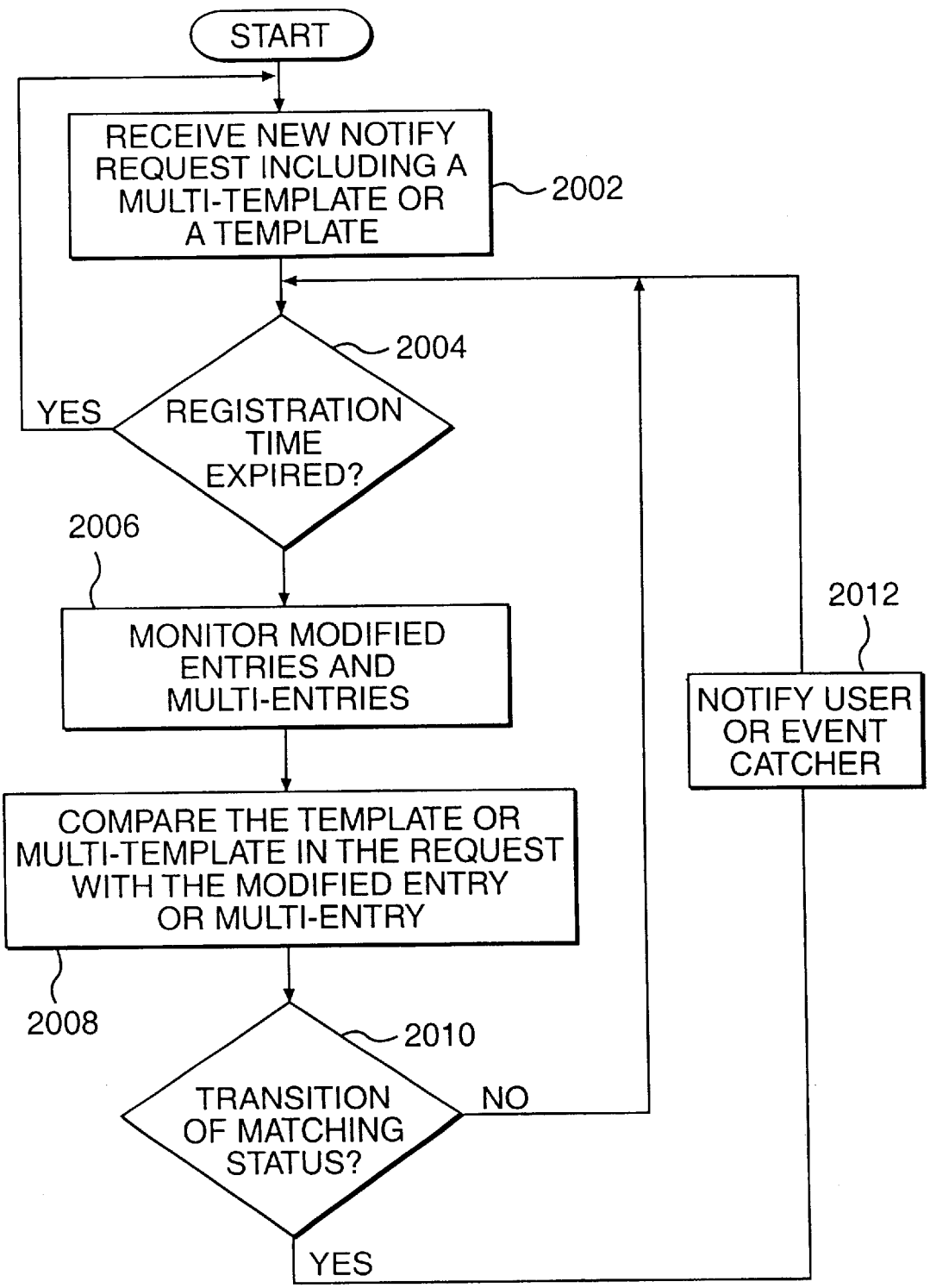
FIG. 20 is a flowchart illustrating steps of a notification operation for use with in-place modification operations consistent with the present invention.

Turning next to FIG. 20, a flowchart is shown which illustrates one implementation of a methodology implemented by search engine 708 to process a notify request received from a user to monitor changes in modified entries or multi-entries. In this case, the notify request may be issued by the user to register interest in specified entries or multi-entries to determine whether they change matching status in relation to the supplied template 1614 or multi-template 1616. When an entry or multi-entry is modified, its matching status can transition by changing from matching the template 1614 or multi-template 1616 to not matching it, or by changing from not matching to matching. When an entry or multi-entry changes its matching status with regard to a template 1614 or multi-template 1616 in a notification operation request, the database manager 704 notifies either the user or an event catcher (see FIG. 2), as desired. When a user invokes a notify request, a lease time is specified which indicates how long the database manager 704 will register the notification. After the specified time has elapsed, the notify registration is canceled.

Thus, as depicted in FIG. 20, when database manager 704 receives a new notify request (step 2002), entries or multi-entries are monitored when they are modified until the registration time expires (steps 2004 and 2006). If an entry or multi-entry is modified in the entry database 710, the search engine 708 determines whether the entry or multi-entry changed its matching status with regard to the template 1614 or multi-template 1616 received in the notification request (step 2008 and 2010). The search engine 708 determines whether the modified entry or multi-entry went from matching the template or multi-template in the request to not matching it or vice versa. If a transition of the matching status occurs, the user or the event catcher is notified (step 2012). Additional entries or multi-entries that have been modified in place continue to be monitored as long as the registration time has not expired (step 2004).

Type-Safe Attribute Matching

Another implementation consistent with the present invention involves attributes that represent various values of database entries represented as objects. In this implementation, by associating attributes to the fields of entries and using entries, multi-entries and their operations, type-safe attribute matching can be achieved. Type-safe attribute matching involves the searching of different types of attributes in a database and allows attributes to be strongly typed. It further allows the enforcing of relationships between attributes and allows efficient referencing and manipulation of attributes by type.

Using type-safe attribute matching, attributes and names are strictly associated with each other (i.e., a pages per minute attribute is associated only with a printer) as well as attributes and their values (i.e., pages per minute is associated only with an integer). Type-safe attribute matching also allows enforcement of relationships between pairs of attributes and their values. It also enables efficient searching for objects by type while allowing objects of many different types to be stored in a single database. Additionally, it permits modifications that affect only a specified type of object in the database, although the database may store many different types of objects.

Consistent with the present invention, type-safe attribute matching is achieved by associating attributes with the fields of an entry. The value stored in the field of the entry is the value of the associated attribute. Since a set of attributes, an entry in this case, can be an instance of a Java™ class, the class provides strong typing of both the set and the individual attributes. For instance, the following example illustrates an entry representing a typical printer with fields representing the attributes of the printer (i.e. pages per minute, resolution, etc.), as well as entries representing more generic information such as names, product data, and physical location:

```
    public class Printer implement Entry {
        Integer ppm;      //  pages per minute
        Integer dpi;      //  resolution in dots per inch
        Boolean duplex;   //  supports two-sided printing
        Boolean color;    //  color or black-only
    }
    public class Name implements Entry {
        String name;         //  the user-friendly name of the service
        String description;  //  free-form description of the service
        String language;     //  language (e.g., English, French) used
                             //  in the above
    }
    public class Type implements Entry {
        String type;     //  the general type of service
        String vendor;   //  vendor of product that implements
                         //  the service
        String model;    //  model number/name of product
        String version;  //  version number of product
    }
    public class Location implements Entry {
        Integer floor;   //  what floor the service is on
        String building; //  what building it's in
        String room;     //  what room it's in
    }
```

As shown, there is strict typing of fields as well as the entries, and these fields and their types will always be associated with these entries and their types. For example, "ppm" or "pages per minute" is of type "Integer".

Further description of an item may be achieved using a multi-entry. Using a multi-entry, a typical printer may also be described as a set of sets of attributes. When describing a typical printer in this manner, additional aspects may be included such as a location, name or machine type each aspect represented by another entry in the multi-entry. The set of entries in the example above form an exemplary multi-entry representing the attributes of a typical printer.

The entry and multi entry operations may be used to search and manipulate these type-safe sets of attributes. These operations include take, write, notify, read, entry modify, multi-entry add, multi-entry modify/delete, and modification notification. It should be noted that other known database operations may be performed in the database systems consistent with the present invention.

For exemplary purposes, assume the existence of two different printers described by the following multi-entries stored in a database. Each printer may have certain properties described by the attributes associated with the fields of the entries in the multi-entry. In this hypothetical example, the first printer has an English name "quick" and a German name "schnell," both with associated descriptions. As shown in the example, it is located on floor 1 of building ABC in room 1202 and also has associated printing characteristics (e.g. ppm=10, dpi=600, etc.) Such a printer may be represented by the following multi-entry:

```
Multi-Entry 1 =
    {Name       [name =          "quick",
                 description =   "yada1",
                 language =      "English"],
     Name       [name =          "schnell",
                 description =   "yahda1",
                 language =      "German"],
     Location   [floor =         1,
                 building =      "ABC",
                 room =          "1202"],
     Printer    [ppm =           10,
                 dpi =           600,
                 duplex =        true,
                 color =         false]}
```

A second printer, having an English name "slow" and located on floor 2 of building XYZ in room 101, also has associated printing characteristics (e.g. ppm=3, dpi=300, etc.). The second printer may be represented by a multi-entry as follows:

```
Multi-Entry 2 =   {Name       [name =          "slow",
                               description =   "yada2",
                               language =      "English"],
                   Location    [floor =         2,
                               building =      "XYZ",
                               room =          "101"],
                   Printer     [ppm =           3,
                               dpi =           300,
                               duplex =        false,
                               color =         true]}
```

Now, suppose a search is required that returns all printers with certain attributes represented by the fields of entries. For example, if a user sought a printer represented in the database that was located in building "XYZ" and was a color printer, the multi-template in the search might be represented as follows:

```
Multi-Template 1 =    {Location   [floor =     null,
                                   building =  "XYZ",
                                   room =      null],
                       Printer    [ppm =       null,
                                   dpi =       null,
                                   duplex =    null,
                                   color =     true]}
```

A user might call a read operation supplying Multi-Template 1 as the parameter. If applied to the database containing Multi-Entries 1 and 2, the Multi-Entry 2 representing the second printer from the previous example would be returned because the Multi-Template 1, shown here, matches Multi-Entry 2. The search engine 708 searches the database, bypassing items of incorrect types, and compares the values stored in the fields of the entries to the values in the templates in the request. As a result, it returns only those with the correct attribute values. This type-safe matching allows objects of different types to be stored in the same database and searched efficiently.

In regard to operations performed in a database employing type-safe attribute matching, suppose a type-safe modification is requested on all items represented in the database possessing certain characteristics. In such a case, the entry/multi-entry modification operations can be used to modify the items in the database. Suppose, for example, a request is formulated to change all of the black and white (color=false) printers at any location to a specific resolution (i.e. dpi 100 and remove their location attributes. Recalling that the multi-entry modify/delete operation takes two parameters, a multi-template to determine which multi-entries in the database will be modified and a multi-entry to dictate the changes to be made, these two parameters can be supplied to represent these changes. Referring back to the previous examples, the first of the parameters of the multi-entry modify/delete operation might be represented in a multi-template as follows:

| Multi-template 2 = { | Location | [floor = | null, |
| | | building = | null, |
| | | room = | null], |
| | Printer | [ppm = | null, |
| | | dpi = | null, |
| | | duplex = | null, |
| | | color = | false]} |

This multi-template seeks all black and white printers regardless of location. Finally, to modify all multi-entries with this property to have a resolution of 100 dpi and remove their location attributes, the modify/delete operation is initiated using the following request:

| Multi-entry modify/delete (Multi-template 2, | | | |
| {null, | | | |
| | Printer | [ppm = | null, |
| | | dpi = | 100, |
| | | duplex = | null, |
| | | color = | null]}) |

The search engine 708 locates all multi-entries in the database matching Multi-template 2 and modifies them according to the second parameter in the operation, as discussed in the multi-entry modify/delete operation method. Multi-Entry 1 from the previous example matches the Multi-Template 2 used in the operation parameter, and therefore, Multi-Entry 1 is changed according to the second parameter of the operation. This operation deletes the location attributes, replaces the dpi attribute with a value of 100 and yields a modified Multi-entry 1:

| Multi-Entry 1 = | | | |
| {Name | [name = | "quick", | |
| | description = | "yada1", | |
| | language = | "English"], | |
| Name | [name = | "schnell", | |
| | description = | "yahda1", | |
| | language = | "German"], | |
| Printer | [ppm = | 10, | |
| | dpi = | 100, | |
| | duplex = | true, | |
| | color = | false]} | |

Hence the search engine sought all items in the database possessing attributes of a requested type and modified them in a type-safe manner, thus implementing type-safe attribute matching. It should be noted that the examples shown are for purposes of illustration only.

Numerous variations and modifications will become apparent to those skilled in the art once the above disclosure is fully appreciated. It is intended that the following claims be interpreted to embrace all such variations and modifications.

What is claimed is:

1. A computer program product comprising a computer readable medium having computer readable code embodied therein for processing data in a database including a plurality of entries, each entry being defined by an entry class type and including a plurality of typed fields, the product comprising:

means for providing a template having a template class type, the template defining a set of attributes;

means for determining whether the entry class type of one of the plurality of entries and the template class type match;

means for comparing the attributes of the template with corresponding fields of the one entry to determine whether the template matches the one entry when it is determined that the entry class type of the one entry and the template class type match; and means for identifying that the one entry is a matching entry when it is determined that the template matches the one entry.

2. A computer program product comprising a computer readable medium having computer readable code embodied therein for processing data in a database including a plurality of entries, each entry being defined by an entry class type and including a plurality of typed fields, by:

providing a template having a template class type, the template defining a set of attributes;

determining whether the entry class type of one of the plurality of entries and the template class type match;

comparing the attributes of the template with corresponding fields of the one entry to determine whether the template matches the one entry when it is determined that the entry class type of the one entry and the template class type match; and identifying that the one entry is a matching entry when it is determined that the template matches the one entry.

3. The product of claim 2, wherein the comparing includes:

comparing only those entries of the same class type as, or a supertype of, the template.

4. The product of claim 2, further including:

modifying the database in response to the identification of the matching entry.

5. A data processing apparatus for type-safe attribute matching in a database including a plurality of entries, each entry being defined by an entry class type and including a plurality of typed fields, the apparatus comprising:

a providing component configured to provide a template having a template class type, the template defining a set of attributes;

a determining component configured to determine whether the entry class type of one of the plurality of entries and the template class type match;

a comparing component configured to compare the attributes of the template with corresponding fields of the one entry to determine whether the template matches the one entry when the determining component determines that the entry class type of the one entry and the template class type match; and an identifying component configured to identify that the one entry is a matching entry when it is determined that the template matches the one entry.

6. The apparatus of claim 5, wherein the comparing component includes:

a comparing component configured to compare only those entries of the same class type as, or a supertype of, the template.

7. The apparatus of claim 5, further including:

a modifying component configured to modify the database in response to the identification of the matching entry.

8. A method for type-safe attribute matching in a database including a plurality of entries, each entry being defined by an entry class type and including a plurality of typed fields, the method comprising:

providing a template having a template class type, the template defining a set of attributes;

determining whether the entry class type of one of the plurality of entries and the template class type match;

comparing the attributes of the template with corresponding fields of the one entry to determine whether the template matches the one entry when it is determined that the entry class type of the one entry and the template class type match; and identifying that the one entry is a matching entry when it is determined that the template matches the one entry.

9. The method of claim 8, wherein the comparing step includes the step of:

comparing only those entries of the same class type as, or a supertype of, the template.

10. The method of claim 8, further including the step of:

modifying the database in response to the identification of the matching entry.

11. The method of claim 10, wherein the providing step includes the step of:

providing a second template of the same template class type as, or a supertype of, the first template, the second template defining a second set of attributes; and wherein the method further includes the step of:

modifying the matching entry to reflect the attributes of the second template.

12. The method of claim 10, further including the step of:

deleting the matching entry.

13. The method of claim 8, wherein the template comprises a wildcard attribute that matches any value in the corresponding field of the entry, and wherein the comparing step further includes the step of comparing non-wildcard attributes of the template to corresponding fields of the one entry.

14. The method of claim 13, wherein the value of the wildcard attribute is a null value.

* * * * *

UNITED STATES PATENT AND TRADEMARK OFFICE
CERTIFICATE OF CORRECTION

PATENT NO. : 6,578,044 B1
DATED : June 10, 2003
INVENTOR(S) : Robert W. Scheifler et al.

It is certified that error appears in the above-identified patent and that said Letters Patent is hereby corrected as shown below:

<u>Title page,</u>
Item [74], should read -- *Attorney, Agent, or Firm* –Finnegan, Henderson, Farabow, Garrett & Dunner, L.L.P. --.

Signed and Sealed this

Twenty-fifth Day of November, 2003

JAMES E. ROGAN
*Director of the United States Patent and Trademark Office*